United States Patent
Yu

(10) Patent No.: US 11,290,974 B2
(45) Date of Patent: Mar. 29, 2022

(54) CONNECTION PROCESSING METHOD AND APPARATUS IN MULTI-ACCESS SCENARIO

(71) Applicant: HUAWEI TECHNOLOGIES CO., LTD., Guangdong (CN)

(72) Inventor: Youyang Yu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/563,236

(22) Filed: Sep. 6, 2019

(65) Prior Publication Data

US 2019/0394745 A1    Dec. 26, 2019

Related U.S. Application Data

(63) Continuation of application No. PCT/CN2018/076763, filed on Feb. 13, 2018.

(30) Foreign Application Priority Data

Mar. 8, 2017 (CN) .......................... 201710133194.6
Jan. 15, 2018 (CN) .......................... 201810037231.8

(51) Int. Cl.
   *H04W 60/00*    (2009.01)
   *H04W 76/16*    (2018.01)
   *H04W 76/11*    (2018.01)

(52) U.S. Cl.
   CPC .......... *H04W 60/005* (2013.01); *H04W 76/11* (2018.02); *H04W 76/16* (2018.02)

(58) Field of Classification Search
   CPC .... H04W 60/005; H04W 76/11; H04W 76/16
   See application file for complete search history.

(56) References Cited

U.S. PATENT DOCUMENTS 8,374,604 B2    2/2013  Cherian et al.
2010/0120427 A1    5/2010  Guo
(Continued)

FOREIGN PATENT DOCUMENTS

CN    101179838 A    5/2008
CN    101415175 A    4/2009
(Continued)

OTHER PUBLICATIONS

Liang Shuang, WO-2018145654-A1 Google Translation, Aug. 2018 (Year: 2018).*
(Continued)

*Primary Examiner* — Liton Miah
(74) *Attorney, Agent, or Firm* — Fish & Richardson P.C.

(57) ABSTRACT

Connection processing methods in a multi-access scenario and apparatus are described. One example method performed by a mobility management functional entity includes receiving a first transmission message sent by an access network device. The first transmission message includes a registration request message, and the registration request message includes first multi-access indication information and identification information. It is determined, based on the first multi-access indication information and the identification information, that the user equipment has registered with a first communications network and has initiated registration with a second communications network. A procedure of registering the user equipment with the second communications network is performed. In the embodiments of the present disclosure, multi-access registration of the user equipment in the first communications network and the second communications network can be implemented.

21 Claims, 16 Drawing Sheets

(56) References Cited

U.S. PATENT DOCUMENTS

| | | | |
|---|---|---|---|
| 2011/0320580 A1 | 12/2011 | Zhou et al. | |
| 2014/0086045 A1 | 3/2014 | Bao et al. | |
| 2017/0303286 A1* | 10/2017 | Sang | H04W 72/0413 |
| 2019/0150219 A1* | 5/2019 | Wang | H04W 76/30 370/329 |
| 2019/0166647 A1* | 5/2019 | Velev | H04L 5/0098 |
| 2019/0281508 A1* | 9/2019 | Kawasaki | H04W 76/20 |
| 2019/0357287 A1* | 11/2019 | Kawasaki | H04W 64/00 |
| 2020/0053802 A1* | 2/2020 | Li | H04W 12/041 |
| 2020/0120570 A1* | 4/2020 | Youn | H04W 36/0033 |
| 2020/0187277 A1* | 6/2020 | Lee | H04W 80/10 |
| 2021/0076455 A1* | 3/2021 | Di Girolamo | H04W 88/005 |

FOREIGN PATENT DOCUMENTS

| | | | | |
|---|---|---|---|---|
| CN | 101635963 A | 1/2010 | | |
| CN | 101771986 A | 7/2010 | | |
| CN | 101841797 A | 9/2010 | | |
| CN | 102511195 A | 6/2012 | | |
| CN | 104822169 A | 8/2015 | | |
| EP | 2187681 A1 | 5/2010 | | |
| EP | 2222116 A1 | 8/2010 | | |
| WO | WO-2018145654 A1 * | 8/2018 | | H04W 76/15 |
| WO | 2019011398 A1 | 1/2019 | | |
| WO | 2019032972 A1 | 2/2019 | | |

OTHER PUBLICATIONS

Office Action issued in Chinese Application No. 201810037231.8 dated Jul. 8, 2020, 14 pages.

3GPP TR 23.882 V8.0.0 (Sep. 2008), "3rd Generation Partnership Project; Technical Specification Group Services and System Aspects; 3GPP System Architecture Evolution; Report on Technical Options and Conclusions (Release 8)," Sep. 2008, 234 pages.

3GPP TR 23 799 V14.0.0 (Dec. 2016), "3rd Generation Partnership Project; Technical Specification Group Services and System Aspects; Study on Architecture for Next Generation System (Release 14)," Dec. 2016, 522 pages.

3GPP TS 23.502 V0.2.0 (Feb. 2017), "3rd Generation Partnership Project; Technical Specification Group Services and System Aspects; Procedures for the 5G System; Stage 2 (Release 15)," Feb. 2017, 71 pages.

3GPP TS 29.244 V1.0.0 (Mar. 2017), "3rd Generation Partnership Project; Technical Specification Group Core Network and Terminals; Interface between the Control Plane and the User Plane of EPC Nodes; Stage 3 (Release 14)," dated Feb. 27, 2017, 111 pages.

3GPP TS 23.501 V0.3.1 (Mar. 2017), "3rd Generation Partnership Project; Technical Specification Group Services and System Aspects; System Architecture for the 5G System; Stage 2 (Release 15)," dated Mar. 6, 2019, 97 pages.

Extended European Search Report issued in European Application No. 18764410.9 dated Oct. 28, 2019, 12 pages.

PCT International Search Report and Written Opinion issued in International Application No. PCT/CN2018/076763 dated May 3, 2018, 18 pages (with English translation).

Office Action issued in Chinese Application No. 201810037231.8 dated Jan. 26, 2021, 4 pages.

Office Action issued in Indian Application No. 201927033914 dated May 27, 2021, 7 pages.

Priority document U.S. Appl. No. 62/587,639, filed Nov. 17, 2017; U.S. Appl. No. 62/544,122, filed Aug. 11, 2017; U.S. Appl. No. 62/571,500, filed Oct. 12, 2017, 248 pages.

EPO Communication pursuant to Article 94(3) EPC issued in European Application No. 18764410.9 dated May 6, 2021, 8 pages.

* cited by examiner

CONNECTION PROCESSING METHOD AND APPARATUS IN MULTI-ACCESS SCENARIO

CROSS-REFERENCE TO RELATED APPLICATIONS

This application is a continuation of International Patent Application No. PCT/CN2018/076763, filed on Feb. 13, 2018, which claims priorities to Chinese Patent Application No. 201710133194.6, filed on Mar. 8, 2017 and Chinese Application No. 201810037231.8 filed on Jan. 15, 2018. The disclosures of the aforementioned applications are hereby incorporated by reference in their entireties.

TECHNICAL FIELD

Embodiments of the present disclosure relate to communications technologies, and in particular, to a connection processing method in a multi-access scenario and an apparatus.

BACKGROUND

To address challenges of wireless broadband technologies and maintain the leading edge of a 3GPP network, the 3GPP standard group formulated a next-generation mobile communications network architecture (Next Generation System), referred to as a 5G network architecture, in 2016. The architecture supports not only a wireless technology (for example, LTE or 5G RAN) defined by the 3GPP standard group in accessing a core network side (5G Core network), but also a non-3GPP access technology in accessing the core network side by using a non-3GPP interworking function (N3IWF) or a next-generation access gateway (ngPDG).

In a current 3GPP communication protocol, how user equipment (UE) registers with both a 3GPP network and a non-3GPP network has not been specified. In other words, a requirement of dual registration of the UE in the 3GPP network and the non-3GPP network cannot be met.

SUMMARY

Embodiments of the present disclosure provide a connection processing method in a multi-access scenario and an apparatus, to meet a requirement of multi-registration of UE in a first communications network and a second communications network.

According to a first aspect, an embodiment of the present disclosure provides a connection processing method in a multi-access scenario, including:

receiving, by a mobility management functional entity, a first transmission message sent by an access network device, where the first transmission message includes a registration request message, the registration request message includes first multi-access indication information and identification information, and the identification information is used for at least one of obtaining context information of user equipment and selecting a network functional entity;

determining, by the mobility management functional entity based on the first multi-access indication information and the identification information, that the user equipment has registered with a first communications network and has initiated registration with a second communications network; and performing, by the mobility management functional entity, a procedure of registering the user equipment with the second communications network.

According to the connection processing method in a multi-access scenario that is provided in the first aspect, multi-access registration of the user equipment in the first communications network and the second communications network can be implemented, thereby meeting a requirement of multi-registration of the user equipment in the first communications network and the second communications network.

With reference to the first aspect, in a possible implementation of the first aspect, the determining, by the mobility management functional entity based on the first multi-access indication information and the identification information, that the user equipment has registered with a first communications network and has initiated registration with a second communications network may specifically include:

obtaining, by the mobility management functional entity, the context information of the user equipment based on the identification information;

determining, by the mobility management functional entity based on the context information of the user equipment, that the user equipment has registered with the first communications network; and determining, by the mobility management functional entity based on the first multi-access indication information, that the user equipment has initiated registration with the second communications network.

With reference to the first aspect and one possible implementation of the first aspect, in another possible implementation of the first aspect, the first transmission message further includes access type indication information; and the determining, by the mobility management functional entity based on the first multi-access indication information and the identification information, that the user equipment has registered with a first communications network and has initiated registration with a second communications network includes:

determining, by the mobility management functional entity based on the access type indication information, the first multi-access indication information, and the identification information, that the user equipment has registered with the first communications network and has initiated registration with the second communications network.

According to a second aspect, an embodiment of the present disclosure provides a connection processing method in a multi-access scenario, including:

receiving, by a mobility management functional entity, a first transmission message sent by an access network device, where the first transmission message includes access type indication information and a registration request message, the registration request message includes identification information, and the identification information is used for at least one of obtaining context information of user equipment and selecting a network functional entity; and determining, by the mobility management functional entity based on the access type indication information and the identification information, that the user equipment has registered with a first communications network and has initiated registration with a second communications network; and performing, by the mobility management functional entity, a procedure of registering the user equipment with the second communications network.

According to the connection processing method in a multi-access scenario that is provided in the second aspect, multi-access registration of the user equipment in the first communications network and the second communications network can be implemented, thereby meeting a requirement of multi-registration of the user equipment in the first communications network and the second communications network.

With reference to the second aspect, in a possible implementation of the second aspect, the determining, by the mobility management functional entity based on the access type indication information and the identification information, that the user equipment has registered with a first communications network and has initiated registration with a second communications network includes:

obtaining, by the mobility management functional entity, the context information of the user equipment based on the identification information;

determining, by the mobility management functional entity based on the context information of the user equipment, that the user equipment has registered with the first communications network; and determining, by the mobility management functional entity based on the access type indication information, that the user equipment has initiated registration with the second communications network.

With reference to the first aspect and one possible implementation of the first aspect, or with reference to the second aspect and one possible implementation of the second aspect, in another possible implementation of the first aspect or the second aspect, before the performing, by the mobility management functional entity, a procedure of registering the user equipment with the second communications network, the method further includes:

determining, by the mobility management functional entity based on subscription information of the user equipment, that the user equipment is allowed to register with the first communications network and the second communications network.

With reference to the first aspect and one possible implementation of the first aspect, or with reference to the second aspect and one possible implementation of the second aspect, in another possible implementation of the first aspect or the second aspect, the method further includes:

if the mobility management functional entity determines, based on the subscription information of the user equipment or local configuration information, that the user equipment is not allowed to register with the first communications network and the second communications network, performing, by the mobility management functional entity, the procedure of registering the user equipment with the second communications network, and initiating a procedure of deregistering the user equipment with the first communications network or deleting a registration state of the user equipment in the first communications network.

With reference to the first aspect and one possible implementation of the first aspect, or with reference to the second aspect and one possible implementation of the second aspect, in another possible implementation of the first aspect or the second aspect, the registration request message further includes second multi-access indication information, and the method further includes:

sending, by the mobility management functional entity, a second transmission message to the session management functional entity, where the second transmission message includes a permanent identifier of the user equipment and protocol data unit (PDU) session establishment request information, the PDU session establishment request information includes a session identifier and the second multi-access indication information, and the second multi-access indication information is used to indicate that the user equipment requests to establish a multi-access PDU session for a session service corresponding to the session identifier.

According to the connection processing method in a multi-access scenario that is provided in this implementation, the multi-access PDU session can be established.

With reference to the first aspect and one possible implementation of the first aspect, or with reference to the second aspect and one possible implementation of the second aspect, in another possible implementation of the first aspect or the second aspect, the second transmission message further includes third multi-access indication information, and the third multi-access indication information includes any one of a multi-access registration indication, a multi-access allowed indication, and a multi-access status indication, where the multi-access registration indication is used to indicate that the user equipment performs multi-access registration with the first communications network and the second communications network, the multi-access allowed indication is used to indicate that the user equipment is allowed to access both the first communications network and the second communications network, and the multi-access status indication is used to indicate a state in which the user equipment accesses both the first communications network and the second communications network.

With reference to the first aspect and one possible implementation of the first aspect, or with reference to the second aspect and one possible implementation of the second aspect, in another possible implementation of the first aspect or the second aspect, the mobility management functional entity is selected by the access network device based on the identification information.

According to a third aspect, an embodiment of the present disclosure provides a connection processing method in a multi-access scenario, including:

receiving, by a session management functional entity, a second transmission message sent by a mobility management functional entity, where the second transmission message includes a permanent identifier of user equipment and PDU session establishment request information, the PDU session establishment request information includes a session identifier and second multi-access indication information, and the second multi-access indication information is used to indicate that the user equipment requests to establish a multi-access PDU session for a session service corresponding to the session identifier; and establishing, by the session management functional entity based on the PDU session establishment request information, a multi-access session for the session service corresponding to the session identifier.

According to the connection processing method in a multi-access scenario that is provided in the third aspect, the multi-access PDU session can be established.

According to the connection processing method in a multi-access scenario that is provided in the third aspect, a multi-access session can be established.

With reference to the third aspect, in a possible implementation of the third aspect, before the establishing, by the session management functional entity based on the PDU session establishment request information, a multi-access session for the session service corresponding to the session identifier, the method further includes:

obtaining, by the session management functional entity, subscription information of the user equipment based on a permanent identifier of the user equipment; and determining, by the session management functional entity based on session service subscription data in the subscription information, that establishment of a multi-access PDU session for the session service corresponding to the session identifier is allowed.

With reference to the third aspect and one possible implementation of the third aspect, in another possible implementation of the third aspect, the second transmission message further includes a third multi-access indication; and determining, by the session management functional entity based on the third multi-access indication information, that establishment of the multi-access PDU session for the session service corresponding to the session identifier is allowed.

With reference to the third aspect and one possible implementation of the third aspect, in another possible implementation of the third aspect, the method further includes:

initiating, by the session management functional entity, a PDU session establishment or update procedure to a user plane functional entity UPF, where the PDU session establishment or update procedure includes sending, by the session management functional entity, a PDU session establishment or update request message, and the PDU session establishment or update request message is used to indicate that the UPF creates a tunnel identifier corresponding to an access network side of a second communications network for the session service.

With reference to the third aspect and one possible implementation of the third aspect, in another possible implementation of the third aspect, if the session management functional entity determines, based on the session service subscription data in the subscription information, that the multi-access PDU session is not allowed to be established for the session service corresponding to the session identifier, the method further includes:

initiating, by the session management functional entity, a PDU session update or establishment procedure to a UPF, where the PDU session update procedure includes sending, by the session management functional entity, a PDU session update or establishment request message, the PDU session update or establishment request message is used to indicate that the UPF updates an access network side tunnel identifier of the session service, and the updating the access network side tunnel identifier of the session service includes storing a tunnel identifier corresponding to an access network side of a second communications network, and deleting or updating a tunnel identifier corresponding to an access network side of a first communications network.

With reference to the third aspect and one possible implementation of the third aspect, in another possible implementation of the third aspect, the method further includes: sending, by the session management functional entity, a correspondence between access type information and an access network side tunnel identifier to the user plane functional entity (UPF); or sending, by the session management functional entity, a correspondence between access type information and an access network side tunnel identifier and a data packet forwarding rule to the UPF, where the data packet forwarding rule includes a correspondence between data flow description information and access type information.

With reference to the third aspect and one possible implementation of the third aspect, in another possible implementation of the third aspect, the method further includes: sending, by the session management functional entity, fifth multi-access indication information and the session identifier to the mobility management functional entity, where the fifth multi-access indication information is used to indicate that a session corresponding to the session identifier is a multi-access PDU session.

With reference to the third aspect and one possible implementation of the third aspect, in another possible implementation of the third aspect, the method further includes: sending, by the session management functional entity, seventh multi-access indication information, the session identifier, and the access type information to a policy control functional entity (PCF), where the seventh multi-access indication information is used to indicate that a PDU session corresponding to the session identifier is a multi-access PDU session; or sending, by the session management functional entity, a fourth transmission message to the PCF, where the fourth transmission message includes the session identifier, access type information of a first communications network, and access type information of a second communications network, and the access type information of the first communications network and the access type information of the second communications network are used to indicate that the PCF stores a binding relationship between the session identifier and the access type information of the first communications network and the access type information of the second communications network.

According to a fourth aspect, an embodiment of the present disclosure provides a connection processing method in a multi-access scenario, including:

when user equipment successfully registers with a first communications network and needs to register with a second communications network, sending, by the user equipment, a registration request message or parameter to an access network device of the second communications network, where the registration request message or parameter includes first multi-access indication information and identification information, where the first multi-access indication information is used for network side access and is used by a mobility management functional entity mobility management functional entity to perform, based on the first multi-access indication information and the identification information, registration of the user equipment in the second communications network, and the identification information is used for at least one of selecting a network functional entity and obtaining context information of the user equipment.

With reference to the fourth aspect, in a possible implementation of the fourth aspect, the registration request message or parameter further includes second multi-access indication information, the second multi-access indication information is used by a session management functional entity to establish, based on the second access indication information, a multi-access session after the user equipment successfully registers with the second communications network.

With reference to any one of the foregoing aspects or possible implementations of the foregoing aspects, the identification information may specifically include at least one of a temporary identifier and network slice selection assistance information of the user equipment.

With reference to any one of the foregoing aspects or possible implementations of the foregoing aspects, the first multi-access indication information includes at least one of multi-access capability indication information and location area registration indication information.

According to a fifth aspect, an embodiment of the present disclosure provides a mobility management functional entity. The mobility management functional entity has a function of implementing behavior of the mobility management functional entity in the foregoing method embodiments. The function may be implemented by hardware, or by hardware executing corresponding software. The hardware or software includes one or more modules corresponding to the foregoing function.

According to a sixth aspect, an embodiment of the present disclosure provides a mobility management functional entity, including a processor, a memory, a bus, and a communications interface. The memory is configured to store a computer executable instruction. The processor and the memory are connected by using the bus. When the mobility management functional entity operates, the processor executes the computer executable instruction stored in the memory, so that the mobility management functional entity performs the connection processing method in a multi-access scenario according to any item in the first aspect or any item in the second aspect.

According to a seventh aspect, an embodiment of the present disclosure provides a computer-readable storage medium, configured to store a computer software instruction that can be used by the foregoing mobility management functional entity. When the computer software instruction runs on a computer, the computer may perform the connection processing method in a multi-access scenario according to any item in the first aspect or any item in the second aspect.

According to an eighth aspect, an embodiment of the present disclosure provides a computer program product including an instruction. When the instruction runs on a computer, the computer may perform the connection processing method in a multi-access scenario according to any item in the first aspect or any item in the second aspect.

In addition, for technical effects of any design manner in the fifth aspect to the eighth aspect, refer to technical effects of different design manners in the first aspect. Details are not described herein again.

According to a ninth aspect, an embodiment of the present disclosure provides a session management functional entity. The session management functional entity has a function of implementing behavior of the session management functional entity in the foregoing method embodiments. The function may be implemented by hardware, or by hardware executing corresponding software. The hardware or software includes one or more modules corresponding to the foregoing function.

According to a tenth aspect, an embodiment of the present disclosure provides a session management functional entity, including a processor, a memory, a bus, and a communications interface. The memory is configured to store a computer executable instruction. The processor and the memory are connected by using the bus. When the session management functional entity operates, the processor executes the computer executable instruction stored in the memory, so that the session management functional entity performs the connection processing method in a multi-access scenario according to any item in the third aspect.

According to an eleventh aspect, an embodiment of the present disclosure provides a computer-readable storage medium, configured to store a computer software instruction that can be used by the foregoing session management functional entity. When the computer software instruction runs on a computer, the computer may perform the connection processing method in a multi-access scenario according to any item in the third aspect.

According to a twelfth aspect, an embodiment of the present disclosure provides a computer program product including an instruction. When the instruction runs on a computer, the computer may perform the connection processing method in a multi-access scenario according to any item in the third aspect.

In addition, for technical effects of any design manner in the ninth aspect to the twelfth aspect, refer to technical effects of different design manners in the third aspect. Details are not described herein again.

According to a thirteenth aspect, an embodiment of the present disclosure provides user equipment. The user equipment has a function of implementing behavior of the session management functional entity in the foregoing method embodiments. The function may be implemented by hardware, or by hardware executing corresponding software. The hardware or software includes one or more modules corresponding to the foregoing function.

According to a fourteenth aspect, an embodiment of the present disclosure provides user equipment, including a processor, a memory, a bus, and a communications interface. The memory is configured to store a computer executable instruction. The processor is connected to the memory by using the bus. When the user equipment operates, the processor executes the computer executable instruction stored in the memory, so that the user equipment performs the connection processing method in a multi-access scenario according to any item of the fourth aspect.

In addition, for technical effects of any design manner in the thirteenth aspect to the fourteenth aspect, refer to technical effects of different design manners in the fourth aspect. Details are not described herein again.

According to a fifteenth aspect, an embodiment of the present disclosure provides a communications system, including the mobility management functional entity according to the sixth aspect, and the session management functional entity according to the tenth aspect.

According to a sixteenth aspect, an embodiment of the present disclosure provides a connection processing method in a multi-access scenario, including:

receiving, by a session management functional entity, a second transmission message sent by a mobility management functional entity, where the second transmission message includes a multi-access PDU session parameter, the multi-access PDU session parameter includes a PDU session establishment request message, and the PDU session establishment request message includes second multi-access indication information and a session identifier, or the multi-access PDU session parameter includes third multi-access indication information and the session identifier; and establishing, by the session management functional entity, a multi-access PDU session for a user equipment based on the multi-access PDU session parameter, where the second multi-access indication information is used to indicate that the user equipment requests to establish a multi-access PDU session for a session service corresponding to the session identifier, and the third multi-access indication information is used to indicate that establishment of the multi-access PDU session for the session service corresponding to the session identifier is allowed.

With reference to the sixteenth aspect, in a possible implementation of the sixteenth aspect, before the establishing, by the session management functional entity, a multi-access PDU session for a user equipment based on the multi-access PDU session parameter, the method further includes:

obtaining, by the session management functional entity, subscription information of the user equipment; and allowing, by the session management functional entity based on at least one of the subscription information, policy information, the second multi-access indication information, or the third multi-access indication information, the multi-access PDU session to be established for the session service corresponding to the session identifier.

With reference to the sixteenth aspect or the foregoing possible implementation of the sixteenth aspect, in another possible implementation of the sixteenth aspect, the method further includes:

sending, by the session management functional entity, a session establishment or update message to a user plane functional entity UPF, where the session establishment or update message is used to instruct the UPF to establish, for the session service, a tunnel identifier corresponding to an access network side of a second communications network.

With reference to the sixteenth aspect or any possible implementation of the sixteenth aspect, in another possible implementation of the sixteenth aspect, when the session management functional entity determines, based on session service subscription data in the subscription information, that the multi-access PDU session is not allowed to be established for the session service corresponding to the session identifier, the method further includes:

sending, by the session management functional entity, a session establishment or update message to a UPF, where the session establishment or update message is used to instruct the UPF to update an access network side tunnel identifier of the session service, and the updating the access network side tunnel identifier of the session service includes storing a tunnel identifier corresponding to an access network side of a second communications network, and deleting or updating a tunnel identifier corresponding to an access network side of a first communications network.

With reference to the sixteenth aspect or any possible implementation of the sixteenth aspect, in another possible implementation of the sixteenth aspect, the method further includes:

searching, by the session management functional entity, for a UPF corresponding to a PDU session based on the session identifier; and the sending, by the session management functional entity, a session establishment or update message to a user plane functional entity (UPF) includes:

selecting, by the session management functional entity, an N3-interface UPF, an uplink classifier UPF, a branching point UPF, or an anchor UPF from UPFs to send the session establishment or update message.

With reference to the sixteenth aspect or any possible implementation of the sixteenth aspect, in another possible implementation of the sixteenth aspect, the method further includes:

sending, by the session management functional entity, fourth multi-access indication information and/or access type information to the UPF, where the fourth multi-access indication information and/or the access type information is used to instruct to store access network side tunnel identifiers of the first communications network and the second communications network.

With reference to the sixteenth aspect or any possible implementation of the sixteenth aspect, in another possible implementation of the sixteenth aspect, the method further includes:

sending, by the session management functional entity, a correspondence between access type information and a tunnel identifier to the UPF; or sending, by the session management functional entity, a data packet forwarding rule to the UPF; or sending, by the session management functional entity, a correspondence between access type information and a tunnel identifier and a data packet forwarding rule to the UPF, where the data packet forwarding rule includes a correspondence between data flow description information and access type information.

With reference to the sixteenth aspect or any possible implementation of the sixteenth aspect, in another possible implementation of the sixteenth aspect, the method further includes:

sending, by the session management functional entity, fifth multi-access indication information and the session identifier to the mobility management functional entity, where the fifth multi-access indication information is used to indicate that the session service corresponding to the session identifier is a multi-access PDU session.

With reference to the sixteenth aspect or any possible implementation of the sixteenth aspect, in another possible implementation of the sixteenth aspect, the method further includes:

sending, by the session management functional entity, seventh multi-access indication information, the session identifier, and the access type information to a PCF, where the seventh multi-access indication information is used to indicate that a PDU session corresponding to the session identifier is a multi-access PDU session; or sending, by the session management functional entity, a fourth transmission message to the PCF, where the fourth transmission message includes the session identifier, access type information of a first communications network, and access type information of a second communications network, and the fourth transmission message is used to indicate that the PCF stores a binding relationship between the session identifier and the access type information of the first communications network and the access type information of the second communications network.

According to a seventeenth aspect, an embodiment of the present disclosure provides a connection processing method in a multi-access scenario, including:

initiating, by user equipment, registration with a first communications network and a second communications network; and after the registration succeeds, sending, by the user equipment, a non-access stratum message to a core-network network device, where the non-access stratum message includes a multi-access PDU session parameter, where the multi-access PDU session parameter is used to indicate that the user equipment requests to establish a multi-access PDU session.

With reference to the seventeenth aspect, in a possible implementation of the seventeenth aspect, the multi-access PDU session parameter includes second multi-access indication information and a session identifier, and the second multi-access indication information is used to indicate that the user equipment requests to establish a multi-access PDU session for a session corresponding to the session identifier; or the multi-access PDU session parameter includes a multi-access PDU session identifier list, the multi-access PDU session identifier list includes at least one session identifier, and the multi-access PDU session identifier list is used to indicate that the user equipment requests to establish a multi-access PDU session for a session corresponding to each of the at least one session identifier.

With reference to the seventeenth aspect or the possible implementation of the seventeenth aspect, in another possible implementation of the seventeenth aspect, before the sending, by the user equipment, a non-access stratum message to a core-network functional entity, the method further includes:

determining, by the user equipment, whether the first communications network and the second communications network belong to a same public land mobile network (PLMN); and/or determining, by the user equipment, whether a PDU session has been established in the first communications network or the second communications network.

With reference to the seventeenth aspect or the possible implementation of the seventeenth aspect, in another possible implementation of the seventeenth aspect, the sending, by the user equipment, a non-access stratum message to a core-network network device includes:

when the first communications network and the second communications network belong to a same PLMN, sending, by the user equipment, the non-access stratum message to the core-network functional entity; or when the first communications network and the second communications network belong to a same PLMN, and the user equipment has established the PDU session in the first communications network or the second communications network, sending, by the user equipment, the non-access stratum message to the core-network functional entity.

With reference to the seventeenth aspect or the possible implementation of the seventeenth aspect, in another possible implementation of the seventeenth aspect, the sending, by the user equipment, a non-access stratum message to a core-network network device includes:

when the user equipment determines that the established PDU session is in connected mode, sending, by the user equipment, a non-access stratum transmission message to the core-network functional entity, where the multi-access PDU session parameter includes second multi-access indication information and a session identifier.

With reference to the seventeenth aspect or the possible implementation of the seventeenth aspect, in another possible implementation of the seventeenth aspect, the sending, by the user equipment, a non-access stratum message to a core-network network device includes:

when the user equipment determines that the established PDU session is in non-activated mode, sending, by the user equipment, a service request message to the core-network network device, where the service request message includes the multi-access PDU session identifier list.

The core-network network device may include a mobility management functional entity or a session management functional entity.

According to an eighteenth aspect, an embodiment of the present disclosure provides a connection processing method in a multi-access scenario, including:

receiving, by a user plane functional entity UPF, fourth multi-access indication information sent by a session management functional entity SMF; and storing, by the UPF, an access network side tunnel identifier of a first communications network and an access network side tunnel identifier of a second communications network for a PDU session based on the fourth multi-access indication information.

With reference to the eighteenth aspect, in a possible implementation of the eighteenth aspect, the method further includes:

receiving, by the UPF, a correspondence between access type information sent by the SMF and an access network side tunnel identifier, and storing, by the UPF, the correspondence between the access type information and the access network side tunnel identifier, where the access network side tunnel identifier includes the access network side tunnel identifier of the first communications network or the access network side tunnel identifier of the second communications network.

With reference to the eighteenth aspect or the foregoing possible implementation of the eighteenth aspect, in another possible implementation of the eighteenth aspect, the method further includes:

receiving, by the UPF, a data packet forwarding rule sent by the SMF, where the data packet forwarding rule includes a correspondence between data flow description information and access type information, and storing, by the UPF, the correspondence between the data flow description information and the access type information;

receiving, by the UPF, a data packet, and determining, based on the correspondence between the data flow description information and the access type information, access type information corresponding to the data packet; and sending, by the UPF, the data packet to an access network side tunnel corresponding to the access type information based on the access type information corresponding to the data packet and the correspondence between the access type information and the access network side tunnel identifier.

According to a nineteenth aspect, an embodiment of the present disclosure provides a connection processing method in a multi-access scenario, including:

receiving, by a user plane functional entity (UPF), access type information sent by a session management functional entity SMF; and storing, by the UPF, a correspondence between an access network side tunnel identifier and the access type information for a PDU session based on the access type information, where the access network side tunnel identifier includes an access network side tunnel identifier of a first communications network or an access network side tunnel identifier of a second communications network.

With reference to the nineteenth aspect, in a possible implementation of the nineteenth aspect, the method further includes:

receiving, by the UPF, a data packet forwarding rule sent by the SMF, where the data packet forwarding rule includes a correspondence between data flow description information and access type information, and storing, by the UPF, the correspondence between the data flow description information and the access type information;

receiving, by the UPF, a data packet, and determining, based on the correspondence between the data flow description information and the access type information, access type information corresponding to the data packet; and sending, by the UPF, the data packet to an access network side tunnel corresponding to the access type information based on the access type information corresponding to the data packet and the correspondence that is stored in the UPF and that is between the access network side tunnel identifier and the access type information.

According to a twentieth aspect, an embodiment of the present disclosure provides a session management functional entity. The session management functional entity has a function of implementing behavior of the session management functional entity in the foregoing method embodiments. The function may be implemented by hardware, or by hardware executing corresponding software. The hardware or software includes one or more modules corresponding to the foregoing function.

According to a twenty-first aspect, an embodiment of the present disclosure provides a session management functional entity, including a processor, a memory, a bus, and a communications interface. The memory is configured to store a computer executable instruction. The processor and the memory are connected by using the bus. When the session management functional entity operates, the processor executes the computer executable instruction stored in the memory, so that the session management functional entity performs the connection processing method in a multi-access scenario according to any item in the sixteenth aspect.

According to a twenty-second aspect, an embodiment of the present disclosure provides a computer-readable storage medium, configured to store a computer software instruction that can be used by the foregoing session management functional entity. When the computer software instruction runs on a computer, the computer may perform the connection processing method in a multi-access scenario according to any item in the sixteenth aspect.

According to a twenty-third aspect, an embodiment of the present disclosure provides a computer program product including an instruction. When the instruction runs on a computer, the computer may perform the connection processing method in a multi-access scenario according to any item in the sixteenth aspect.

According to a twenty-fourth aspect, an embodiment of the present disclosure provides user equipment, including:

a registration module, configured to initiate registration with a first communications network and a second communications network; and a processing module, configured to: after the registration succeeds, send a non-access stratum message to a core-network network device by using a sending module, where the non-access stratum message includes a multi-access PDU session parameter, and the multi-access PDU session parameter is used to indicate that the user equipment requests to establish a multi-access PDU session.

With reference to the twenty-fourth aspect, in a possible implementation of the twenty-fourth aspect, the multi-access PDU session parameter includes second multi-access indication information and a session identifier, and the second multi-access indication information is used to indicate that the user equipment requests to establish a multi-access PDU session for a session corresponding to the session identifier; or the multi-access PDU session parameter includes a multi-access PDU session identifier list, the multi-access PDU session identifier list includes at least one session identifier, and the multi-access PDU session identifier list is used to indicate that the user equipment requests to establish a multi-access PDU session for a session corresponding to each of the at least one session identifier.

With reference to the twenty-fourth aspect or the possible implementation of the twenty-fourth aspect, in another possible implementation of the twenty-fourth aspect, the processing module is further configured to: before the non-access stratum message is sent to the core-network functional entity, determine whether the first communications network and the second communications network belong to a same PLMN; and/or determine that a PDU session has been established in the first communications network or the second communications network.

According to a twenty-fifth aspect, an embodiment of the present disclosure provides user equipment, including a processor, a memory, a bus, and a communications interface. The memory is configured to store a computer executable instruction. The processor is connected to the memory by using the bus. When the user equipment operates, the processor executes the computer executable instruction stored in the memory, so that the user equipment performs the connection processing method in a multi-access scenario according to any item of the seventeenth aspect.

According to a twenty-sixth aspect, an embodiment of the present disclosure provides a computer-readable storage medium, configured to store a computer software instruction that can be used by the foregoing user equipment. When the computer software instruction runs on a computer, the computer may perform the connection processing method in a multi-access scenario according to any item in the seventeenth aspect.

According to a twenty-seventh aspect, an embodiment of the present disclosure provides a computer program product including an instruction. When the instruction runs on a computer, the computer may perform the connection processing method in a multi-access scenario according to any item in the seventeenth aspect.

According to a twenty-eighth aspect, an embodiment of the present disclosure provides a user plane functional entity. The user plane functional entity has a function of implementing behavior of the user plane functional entity in the foregoing method embodiments. The function may be implemented by hardware, or by hardware executing corresponding software. The hardware or software includes one or more modules corresponding to the foregoing function.

According to a twenty-ninth aspect, an embodiment of the present disclosure provides a user plane functional entity, including a processor, a memory, a bus, and a communications interface. The memory is configured to store a computer executable instruction. The processor and the memory are connected by using the bus. When the user plane functional entity operates, the processor executes the computer executable instruction stored in the memory, so that the user plane functional entity performs the connection processing method in a multi-access scenario according to any item in the eighteenth aspect or any item in the nineteenth aspect.

According to a thirtieth aspect, an embodiment of the present disclosure provides a computer readable storage medium, configured to store a computer software instruction that can be used by the foregoing user plane functional entity. When the computer software instruction runs on a computer, the computer may perform the connection processing method in a multi-access scenario according to any item in the eighteenth aspect or any item in the nineteenth aspect.

According to a thirty-first aspect, an embodiment of the present disclosure provides a computer program product including an instruction. When the instruction runs on a computer, the computer may perform the connection processing method in a multi-access scenario according to any item in the eighteenth aspect or any item in the nineteenth aspect.

According to the connection processing method in a multi-access scenario and the apparatus in the embodiments of the present disclosure, the user equipment can connect to and register with the second communications network again after successfully registering with the first communications network, so that the multi-access registration of the user equipment in the first communications network and the second communications network can be implemented, thereby meeting the requirement of multi-registration of the user equipment in the first communications network and the second communications network.

BRIEF DESCRIPTION OF DRAWINGS

To describe the technical solutions in the embodiments of the present disclosure or in the prior art more clearly, the following briefly describes the accompanying drawings required for describing the embodiments or the prior art.

DESCRIPTION OF EMBODIMENTS

To make the objective, technical solutions, and advantages of the embodiments of the present disclosure clearer, the following clearly describes the technical solutions in the embodiments of the present disclosure with reference to the accompanying drawings in the embodiments of the present disclosure.

Figure 1:
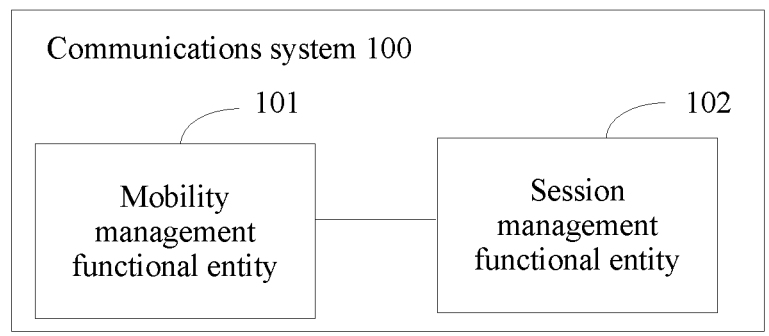
FIG. 1 is a schematic structural diagram of a communications system 100 according to an embodiment of the present disclosure.

FIG. 1 is a schematic structural diagram of a communications system 100 according to an embodiment of the present disclosure. As shown in FIG. 1, the communications system 100 in this embodiment may include a mobility management functional entity 101 and a session management functional entity 102. The mobility management functional entity 101 and the session management functional entity 102 are communicatively connected. The mobility management functional entity 101 may determine, based on first multi-access indication information and identification information, that user equipment has registered with a first communications network and has initiated registration with a second communications network, or may determine, based on access type indication information and identification information, that user equipment has registered with a first communications network and has initiated registration with a second communications network, and perform a procedure of registering the user equipment with the second communications network, so that multi-access registration of the user equipment in the first communications network and the second communications network is implemented, thereby meeting a multi-registration requirement of the user equipment in the first communications network and the second communications network. After the user equipment successfully registers with the first communications network and the second communications network, the session management functional entity 102 may receive a second transmission message sent by the mobility management functional entity 101. The second transmission message includes a permanent identifier of the user equipment and PDU session establishment request information. The PDU session establishment request information includes the session identifier and the second multi-access indication information. The second multi-access indication information is used to indicate that the user equipment requests to establish a multi-access PDU session for a session service corresponding to the session identifier. The session management functional entity 102 establishes, based on the PDU session establishment request information, a multi-access session for the session service corresponding to the session identifier, so that the multi-access session is established.

Optionally, the system shown in FIG. 1 may further include user equipment, an access network device of a second communications network, and the like. When the user equipment successfully registers with a first communications network and needs to register with the second communications network, the user equipment sends a registration request message to the access network device of the second communications network. The registration request message specifically includes first multi-access indication information and identification information. The access network device selects the mobility management functional entity 101 of the first communications network based on the identification information. The access network device sends the first transmission message to the mobility management functional entity 101. The first transmission message includes the registration request message and access type indication information. The mobility management functional entity 101 receives the first transmission messages, to implement multi-access registration of the user equipment in the first communications network and the second communications network. Optionally, the first transmission message may further include the PDU session establishment request information, to establish the multi-access session.

It should be noted that the mobility management functional entity, the session management functional entity, or the like in the system shown in FIG. 1 is merely a name, and the name constitutes no limitation on the device. In a future 5G network and another future network, a network element or an entity corresponding to the mobility management functional entity or the session management functional entity may have another name. This is not specifically limited in this embodiment of the present disclosure. For example, the mobility management functional entity may alternatively be replaced with a mobility management function, mobility management, or the like. The session management functional entity may alternatively be replaced with a session management function, session management, or the like. This is centrally described herein, and details are not described again below. In a 5G network, the mobility management functional entity may be specifically represented in a form of an access and mobility management functional entity (the AMF), and the session management functional entity may be specifically represented in a form of a session management functional entity (SMF). A connection processing method in a multi-access scenario in the embodiments of the present disclosure is described in detail by using an AMF and an SMF in the following embodiment.

Figure 2:
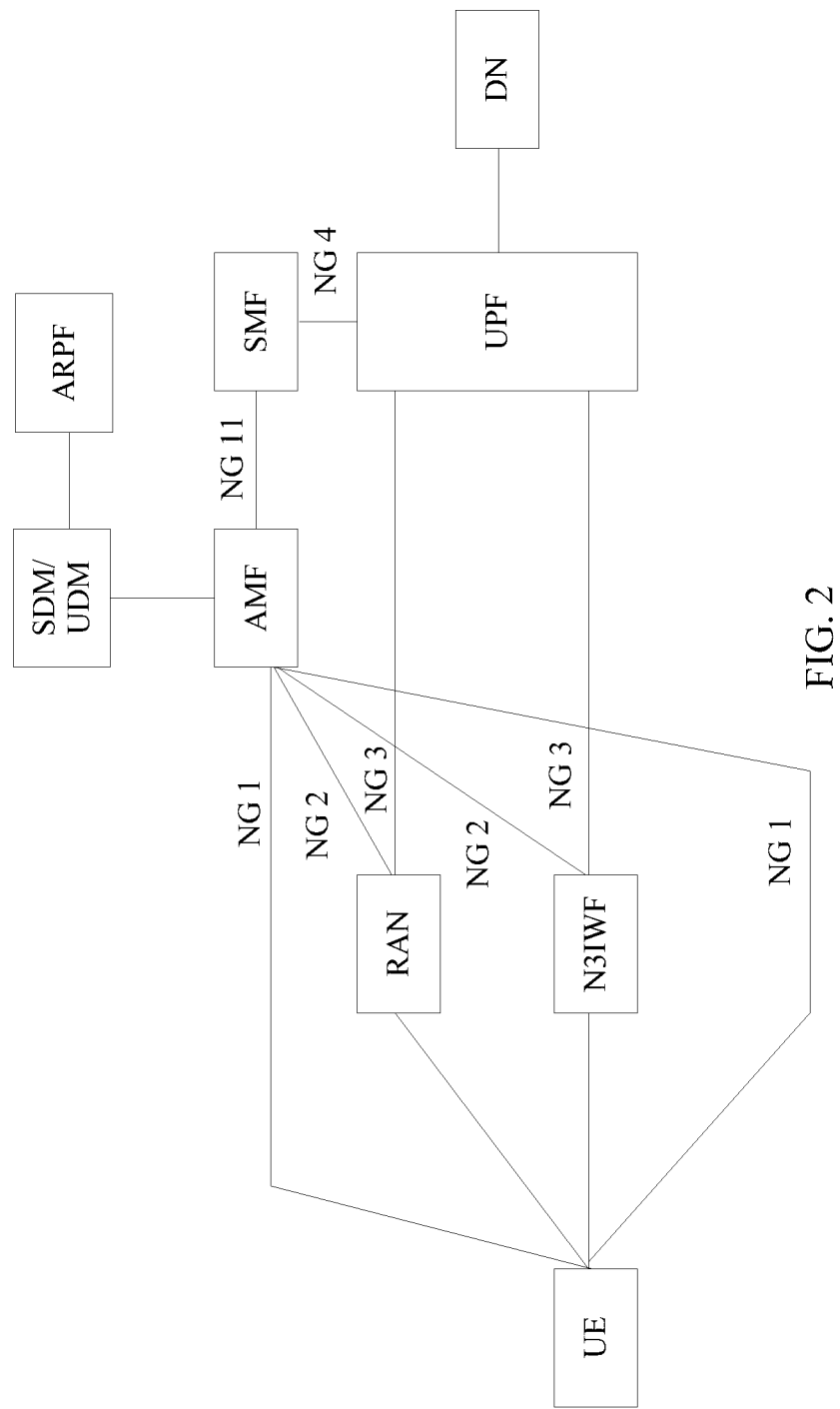
FIG. 2 is a schematic diagram of another system architecture according to an embodiment of the present disclosure.

FIG. 2 is a schematic diagram of another system architecture according to an embodiment of the present disclosure. The system architecture shown in FIG. 2 may be a specific representation form of the communications system shown in FIG. 1. As shown in FIG. 2, the system architecture in this embodiment may be referred to as a 5G network architecture. The network architecture supports not only a wireless technology (for example, LTE or 5G RAN) defined by the 3GPP standard group in accessing a core network side, where the core network side in this embodiment of the present disclosure may be referred to as a 5G core network side, but also a non-3GPP access technology in accessing the core network side by using a non-3GPP interworking functional entity (N3IWF), a next-generation access gateway (ngPDG), a fixed network access gateway, or a trusted non-3GPP access gateway. In other words, the system architecture in this embodiment of the present disclosure supports UE in accessing a 5G core network side by using different access technologies. Core network functions are classified into a user plane network element functional entity (UPF) and a control plane network element functional entity (CPF). The user plane network element functional entity is mainly responsible for packet data packet forwarding, QoS control, charging information collection, or the like. The control plane network element functional entity is mainly responsible for user registration and authentication, mobility management, delivering a data packet forward policy to a user plane (UPF), a QoS control policy, or the like. The CPF may be further subdivided into an access and mobility management functional entity (AMF) and a session management functional entity (SMF). Specifically, the AMF is responsible for performing a registration procedure during user access and location management in a user movement process. The SMF is responsible for establishing a corresponding session connection on the core network side when a user initiates a service, and providing a specific service or the like for the user. In addition, the core network side may further include an independent authentication functional entity (AUSF), responsible for user authentication based on an authentication vector in user subscription data during user registration. The subscription data of the user is stored in a user subscription data management functional entity (SDM/UDM). An authentication-related key and the authentication vector are stored in an authentication credential repository (ARPF).

An access technology of a first communications network or an access technology of a second communications network includes: a 3GPP access technology, a non-3GPP access technology, a fixed network access technology (or a fixed network access technology or a wired access technology), a WLAN access technology, a trusted WLAN access technology, an untrusted WLAN access technology, a 5G RAN access technology, an LTE access technology, or the like.

The foregoing access technology may be indicated by using access type information or radio access type information. The access type information may also be referred to as access type indication information.

Specifically, as shown in FIG. 2, the UE may be connected to the AMF by using a RAN and/or an N3IWF. The AMF is separately connected to the SMF, the SDM/UDM, and the ARPF. The SMF is connected to the UPF. The UPF is connected to a data network (DN). The DN may be specifically the Internet, or may be an IMS network.

As shown in FIG. 2, interfaces and connections in the system architecture include: an NG 1, an NG 2, an NG 3, an NG 4, and an NG 11. The NG 1 is a control plane connection between the user equipment and the AMF, and is used to transmit control signaling between the user equipment and a core network control plane. Specifically, a message on the NG 1 connection may be transmitted through a connection between the UE and the RAN and the NG 2 between the RAN and the AMF, or may be transmitted through a connection between the UE and the N3IWF and the NG 2 between the N3IWF and the AMF. The NG 2 is a control plane connection between the RAN and the AMF and a control plane between the N3IWF and the AMF, and is used to transmit control signaling between the core network control plane and the RAN or the N3IWF, and support the NG 1 connection between the UE and the core network control plane. The NG 3 is a connection between the RAN and the user plane function and a connection between the N3IWF and the user plane function, and is used to support a protocol data unit (PDU for short) session connection established for the user equipment. The NG 4 is a connection between the SMF and the user plane function, and is used to transfer control signaling between the SMF and the user plane function. The NG 11 is a connection between the AMF and the SMF, and is used to transmit control signaling related to a session service.

Specifically, the AMF, the SMF, and the UE shown in FIG. 2 may perform steps of the following method embodiment, so that when the UE connects to a 3GPP side again after successfully registers with a non-3GPP side, multi-registration of the UE on the 3GPP side and the non-3GPP side can be implemented on a network side. Alternatively, when the UE connects to a non-3GPP side again after successfully registering with a 3GPP side, multi-registration of the UE on the 3GPP side and the non-3GPP side can be implemented on a network side.

Further, a multi-access session can be established while the multi-registration of the UE is implemented, thereby reducing a session establishment latency, and effectively improving user service experience.

It should be noted that, in addition to the functions in this embodiment of the present disclosure, the AMF, the SMF, the UPF, and the like in the system architecture shown in FIG. 2 may further have other functions. This is not specifically limited in this embodiment of the present disclosure.

It should be noted that a radio access network (RAN) device in this specification is a device that connects a terminal to a wireless network, and may be a base transceiver station (BTS) in a global system for mobile communications (GSM) or code division multiple access (CDMA), or may be a NodeB (NB) in wideband code division multiple access (WCDMA), or may be an evolved NodeB (eNB or eNodeB) in long term evolution (LTE), a relay station, an access point, a base station, or the like in a future 5G network. This is not limited herein.

The user equipment (UE) in this specification may represent any applicable end-user equipment, and may include (or may represent) a device such as a wireless transmit/receive unit (WTRU), a mobile station, a mobile node, a mobile device, a fixed or mobile subscription unit, a pager, a mobile phone, a palmtop computer (PDA), a smartphone, a notebook computer, a computer, a touchscreen device, a wireless sensor, or a consumer digital device. The "mobile" station/node/device herein represents a station/node/device connected to a wireless (or mobile) network, and is not necessarily related to actual mobility of the station/node/device.

In this specification, "a plurality of" means two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

It should be noted that a name of the non-3GPP access gateway in this embodiment of the present disclosure may be the N3IWF, or may be the ngPDG or may be another name indicating an entity that supports non-3GPP access. This is not limited in this embodiment of the present disclosure.

It should be noted that multi-access registration in this embodiment of the present disclosure may also be referred to as multi-area registration. In other words, "multi-access" may be replaced with "multi-area". This is not limited in this embodiment of the present disclosure.

It should be noted that a "first transmission message" and a "second transmission message" in this embodiment of the present disclosure are used only to distinguish between transmission messages of different interfaces. Message names of the transmission messages are not limited thereto.

Figure 3:
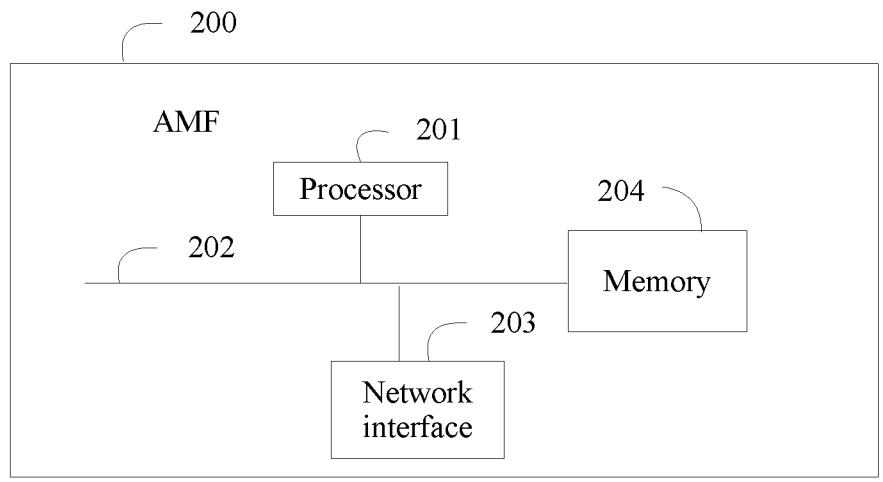
FIG. 3 is a schematic structural diagram of an AMF 200 according to an embodiment of the present disclosure.

FIG. 3 is a schematic structural diagram of an AMF 200 according to an embodiment of the present disclosure. The AMF 200 includes at least one processor 201, at least one network interface 203, a memory 204, and at least one communications bus 202. The communications bus 202 is configured to implement connection and communication between these components. The memory 204 may include a read-only memory and a random access memory, and provide an instruction and data to the processor 201. A part of the memory 204 may further include a non-volatile random access memory (NVRAM).

In this embodiment of the present disclosure, the processor 201 is configured to perform steps of the following method embodiment by invoking a program or an instruction stored in the memory 204, so that user equipment can connect to and register with a second communications network again after successfully registering with a first communications network, and multi-access registration of the user equipment in the first communications network and the second communications network can be implemented, thereby meeting a requirement of multi-registration of the user equipment in the first communications network and the second communications network. For a specific implementation process, refer to the following method embodiments.

It should be noted that the AMF in this embodiment of the present disclosure may alternatively be implemented by using a network function virtualization (NFV for short) technology.

It should be noted that the AMF, an SMF, and a UPF in this embodiment of the present disclosure each may be implemented by one entity device, or may be jointly implemented by a plurality of entity devices. This is not specifically limited in this embodiment of this application. In other words, it may be understood that the AMF, the SMF, the UPF, and the like in this embodiment of the present disclosure each may be a logical function module in an entity device, or may be a logical function module including a plurality of entity devices. This is not specifically limited in this embodiment of the present disclosure.

The "first communications network" and the "second communications network" in this specification are used only to distinguish between different communications networks. The "first communications network" is used to indicate a network with which the UE has registered. The "second communications network" is used to indicate a network, namely, another communications network with which the UE is to register after the UE has registered with the first communications network. The first communications network and the second communications network may have different access networks but a same core network. In other words, as shown in FIG. 2, the UE may access a core network by using different access network devices. For example, when the first communications network is a 3GPP network, and an access network device of the first communications network is a RAN device, the second communications network is a non-3GPP network, and an access network device of the second communications network is an N3IWF. In other words, when the first communications network is a non-3GPP network, the access network device of the first communications network is an N3IWF, the second communications network is a 3GPP network, and an access network of the second communications network is a RAN.

Figure 4:
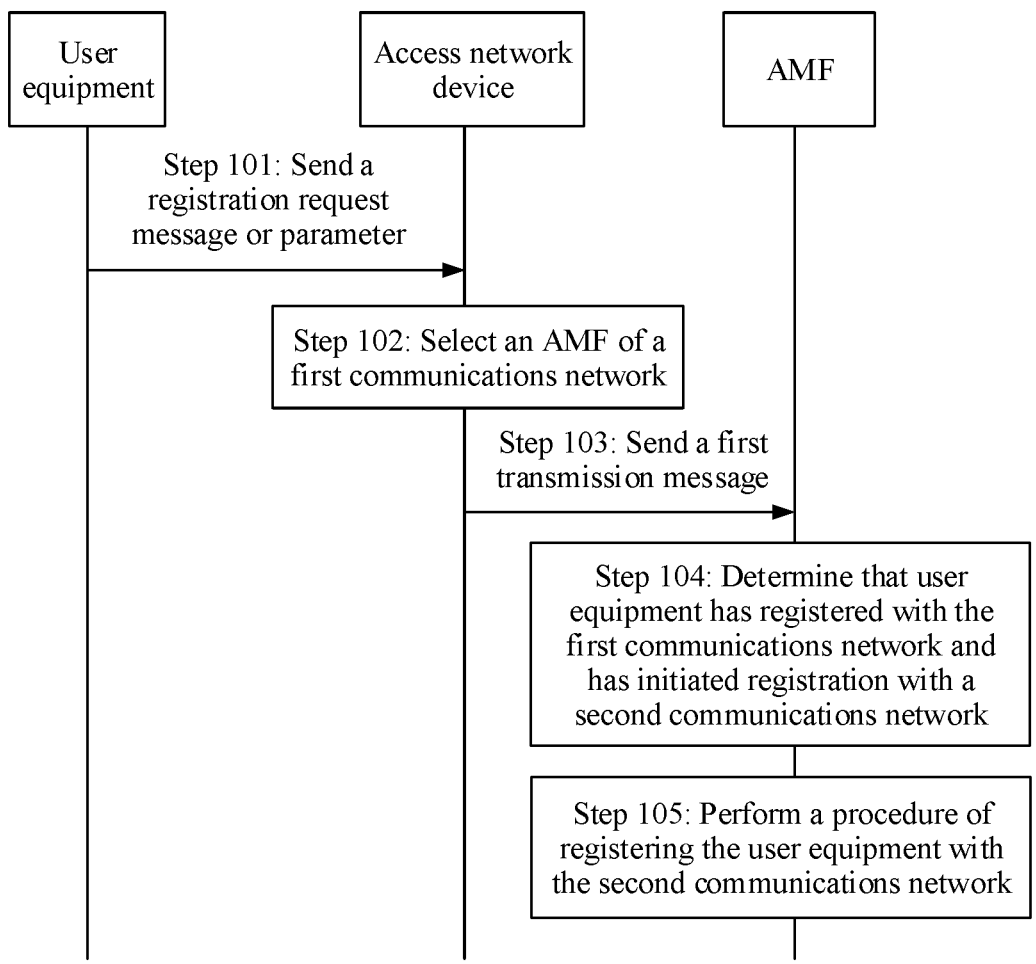
FIG. 4 is a flowchart of a connection processing method in a multi-access scenario according to an embodiment of the present disclosure.

FIG. 4 is a flowchart of a connection processing method in a multi-access scenario according to an embodiment of the present disclosure. As shown in FIG. 4, the method in this embodiment may include the following steps.

Step 101: When user equipment successfully registers with a first communications network and needs to register with a second communications network, the user equipment sends a registration request message or parameter to an access network device of the second communications network. The access network device of the second communications network receives the registration request message or parameter.

The registration request message or parameter may specifically include first multi-access indication information and identification information.

The first multi-access indication information is used by an AMF to perform, based on the first multi-access indication information and the identification information, registration of the user equipment in the second communications network. The identification information is used for at least one of selecting a network functional entity and obtaining context information of the user equipment.

Specifically, the identification information may be temporary identifier (Temporary ID) information. The temporary identifier information may be user temporary identifier information (Temporary User ID), user equipment temporary identifier information (Temporary UE ID), or the like that is allocated by a network side to a user, and certainly, may alternatively be other information. No examples are provided one by one herein. The temporary identifier information includes information about the AMF, for example, a device identifier of the AMF. For example, if the UE has registered with a network through non-3GPP before a connection is established between the UE and a RAN side, a temporary identifier is a temporary identifier that is obtained by the UE from a non-3GPP side and that is allocated by a network side. It may be understood that, if the UE has registered with the network through 3GPP before a connection is established between the UE and an N3IWF side, the temporary identifier is a temporary identifier that is obtained by the UE from a 3GPP side and that is allocated by the network side.

If the user equipment sends the foregoing parameter to the access network device of the second communications network, the access network device of the second communications network receives the parameter, and the access network device generates the registration request message based on the parameter.

Step 102: The access network device selects an AMF of the first communications network based on the identification information.

Specifically, the user equipment has successfully registered with the first communications network and needs to register with the second communications network. Therefore, to implement registration of the user equipment in the second communications network, first, the access network device needs to determine the AMF based on the identification information. The AMF is an AMF registered by the user equipment in the first communications network. The AMF stores context information and subscription information of the UE.

Step 103: The access network device sends a first transmission message to the AMF.

The AMF receives the first transmission message sent by the access network device. The first transmission message may be specifically a first transmission message, or may be another message. This is not limited in this embodiment of the present disclosure.

The first transmission message includes the registration request message and access type indication (Radio Access type, RAT type) information. The registration request message is a registration request message sent by the user equipment in step 101. The access type indication information is generated by an access network device.

Specifically, when the access network device is a 3GPP radio access network device, the access type indication information is of any one of a 3GPP access type, a radio access network RAN access type, or a long term evolution LTE access type; or when the access network device is non-3GPP access interworking functional entity N3IWF, the access type indication information is of any one of a non-3GPP access type, a wireless local area network WLAN access type, or a fixed network access type.

Step 104: The AMF determines, based on the access type indication information and the identification information, or the first multi-access indication information and the identification information, that the user equipment has registered with the first communications network and has initiated registration with the second communications network.

Step 105: The AMF performs a procedure of registering the user equipment with the second communications network.

Specifically, when the AMF determines that the user equipment has registered with the first communications network and has initiated registration with the second communications network, step 105 is directly performed to complete registration of the user equipment in the second communications network, so that the user equipment registers with the first communications network and the second communications network, in other words, multi-access registration is implemented.

Optionally, step 104 may be specifically implemented in the following three manners:

Manner 1: The AMF obtains the context information of the user equipment based on the identification information. The AMF determines, based on the context information of the user equipment, that the user equipment has registered with the first communications network. The AMF determines, based on the access type indication information, that the user equipment has initiated registration with the second communications network.

Manner 2: The first multi-access indication information may specifically include at least one of multi-access capability indication information and location area registration indication information. Correspondingly, a specific implementation of step 104 is as follows: The AMF obtains the context information of the user equipment based on the identification information. The AMF determines, based on the context information of the user equipment, that the user equipment has registered with the first communications network. The AMF determines, based on the multi-access capability indication information or the location area registration indication information, that the user equipment has initiated registration with the second communications network.

An implementation in which the first multi-access indication information is the multi-access capability indication information may be: setting a capability parameter of the UE to a multi-access capability indication.

Manner 3: The AMF determines, based on the access type indication information, the first multi-access indication information, and the identification information, that the user equipment has registered with the first communications network and has initiated registration with the second communications network.

In this embodiment, when the user equipment successfully registers with the first communications network and needs to register with the second communications network, the user equipment sends the registration request message to the access network device of the second communications network. The registration request message specifically includes the first multi-access indication information and the identification information. The access network device selects the AMF of the first communications network based on the identification information. The access network device sends the first transmission message to the AMF. The first transmission message includes the registration request message and the access type indication information. The AMF determines, based on the access type indication information and the identification information, or the first multi-access indication information and the identification information, that the user equipment has registered with the first communications network and has initiated registration with the second communications network. The AMF performs the procedure of registering the user equipment with the second communications network. In this way, the user equipment can connect to and register with the second communications network again after successfully registering with the first communications network, so that the multi-access registration of the user equipment in the first communications network and the second communications network can be implemented, thereby meeting a requirement of multi-registration of the user equipment in the first communications network and the second communications network.

The technical solution of the method embodiment shown in FIG. 4 is described in detail below by using a specific embodiment.

Figure 5:
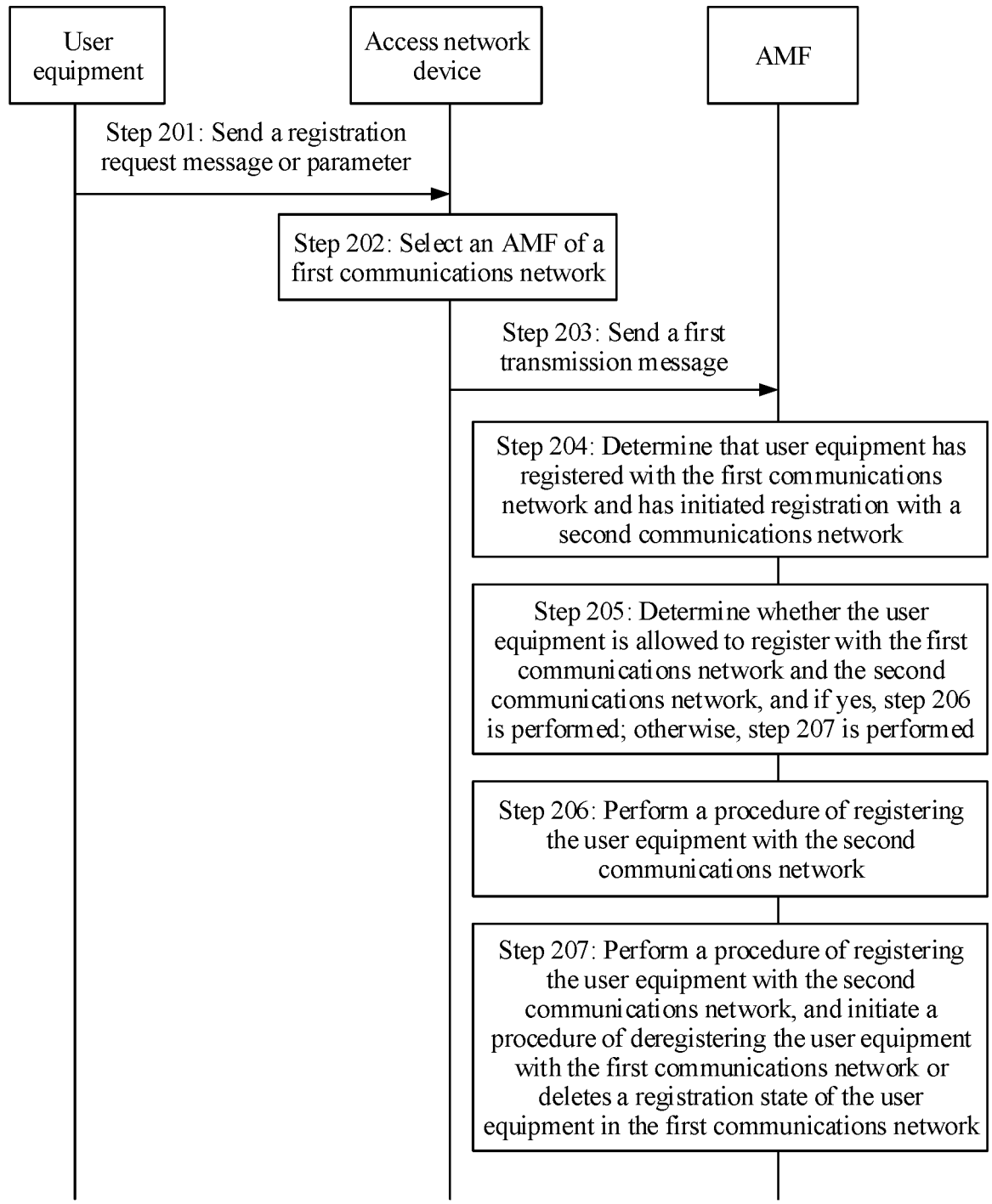
FIG. 5 is a flowchart of a connection processing method in another multi-access scenario according to an embodiment of the present disclosure.

FIG. 5 is a flowchart of a connection processing method in another multi-access scenario according to an embodiment of the present disclosure. As shown in FIG. 5, the method in this embodiment may include the following steps.

Step 201 to step 204 are the same as step 101 to step 104. For detailed descriptions of step 201 to step 204, refer to step 101 to step 104 in the embodiment shown in FIG. 4. Details are not described herein again.

Step 205: The AMF determines, based on subscription information of the user equipment, whether the user equipment is allowed to register with the first communications network and the second communications network, and if yes, step 206 is performed; otherwise, step 207 is performed.

Specifically, in step 204, the AMF may obtain context information of the user equipment. The context information includes a permanent identifier of the user equipment. The permanent identifier may be an international mobile subscriber identity (IMSI). The AMF obtains the subscription information of the user equipment based on the permanent identifier, and determines, based on the subscription information, whether the user equipment is allowed to register with the first communications network and the second communications network.

Step 206: The AMF performs a procedure of registering the user equipment with the second communications network.

Specifically, the AMF completes the procedure of registering the user equipment with the second communications network, and stores a multi-access registration state of the user equipment in the first communications network and the second communications network, in other words, a state in which the user equipment registers with both the first communications network and the second communications network.

Step 207: The AMF performs a procedure of registering the user equipment with the second communications network, and initiates a procedure of deregistering the user equipment with the first communications network or deletes a registration state of the user equipment in the first communications network.

Specifically, the user equipment is not allowed to register with both the first communications network and the second communications network. Therefore, the AMF performs the procedure of registering the user equipment with the second communications network, initiates the procedure of deregistering the user equipment with the first communications network when the user equipment is in connected mode, and deletes the registration state of the user equipment in the first communications network when the user equipment is in idle mode.

In an optional implementation, determining whether the user equipment is allowed to register with the first communications network and the second communications network may alternatively be: determining, by the AMF based on the subscription information and/or local configuration information, whether the user equipment is allowed to register with the first communications network and the second communications network. The local configuration information is specifically a local policy configured by an operator. The local configuration information has no direct relationship with single UE. The local configuration information may be used to perform control based on a larger granularity. For example, the operator performs configuration to prohibit a roaming subscriber from performing multi-access registration, or to prohibit a user from performing multi-access registration in different PLMNs.

Optionally, after step 206, the method may further include: sending, by the AMF, a registration success message to the UE, and replying to, by the UE, the AMF with a registration complete message.

In this embodiment, when the user equipment needs to connect to and register with the second communications network after successfully registering with the first communications network, it can be determined, based on the subscription information of the user equipment, whether the user equipment is allowed to perform multi-access registration in the first communications network and the second communications network, so that a requirement of multi-access registration of the user equipment in the first communications network and the second communications network is met.

The embodiments shown in FIG. 4 and FIG. 5 are both used to implement multi-registration of the user equipment in the first communications network and the second communications network in the multi-access scenario. Based on the foregoing embodiments, in an embodiment of the present disclosure, a multi-access session may be further established. Specifically, in the embodiments shown in FIG. 4 and FIG. 5, the registration request message further includes second multi-access indication information. After completing the procedure of registering the user equipment with the second communications network, the AMF completes establishment of the multi-access session according to the following embodiment shown in FIG. 6A and FIG. 6B. For details, refer to descriptions of the embodiment shown in FIG. 6A and FIG. 6B.

Figure 6A:
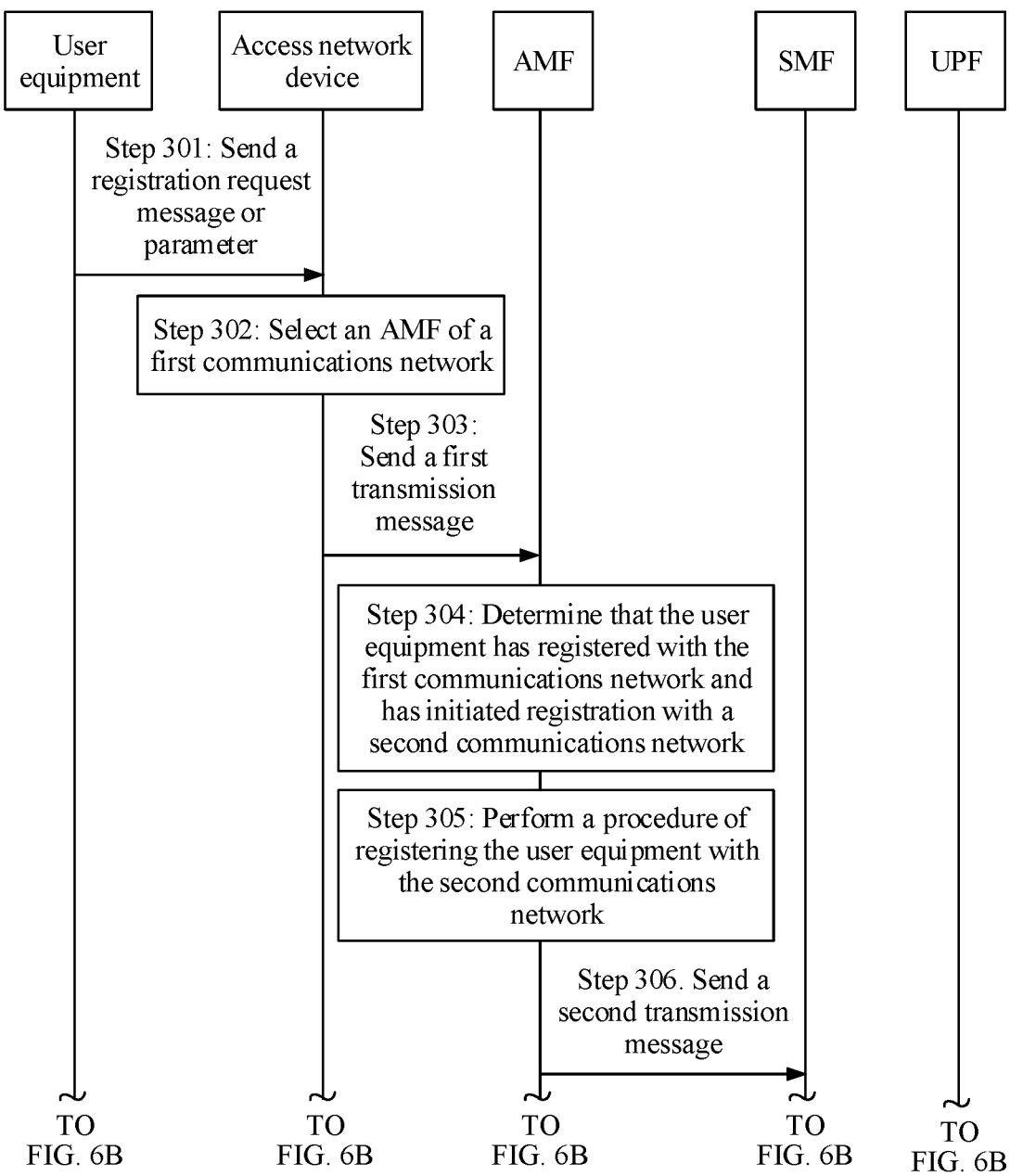
FIG. 6A and FIG. 6B are a flowchart of a connection processing method in another multi-access scenario according to an embodiment of the present disclosure.
Figure 6B:
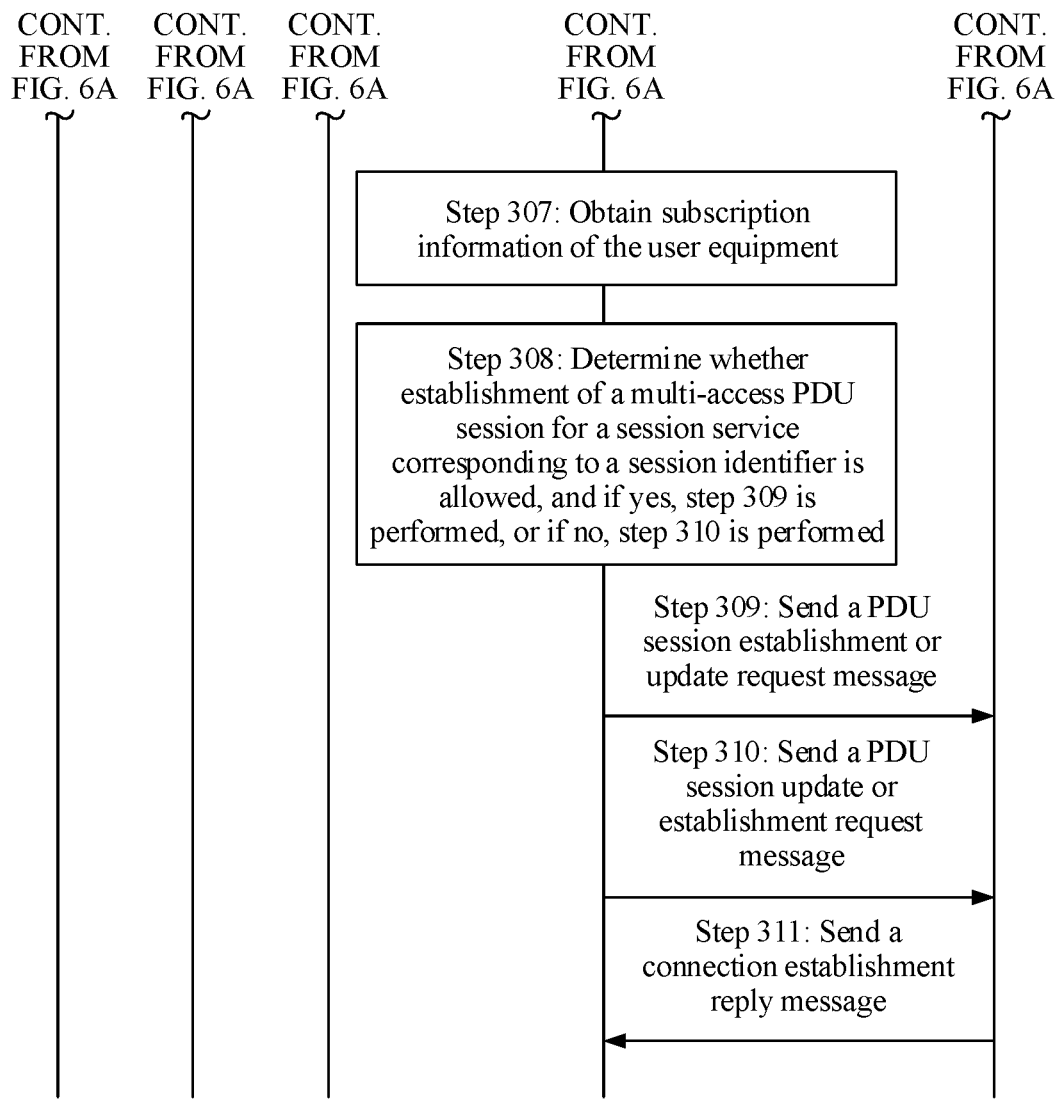

FIG. 6A and FIG. 6B are a flowchart of a connection processing method in another multi-access scenario according to an embodiment of the present disclosure. As shown in FIG. 6A and FIG. 6B, the method in this embodiment may include the following steps.

Step 301: When user equipment successfully registers with a first communications network and needs to register with a second communications network, the user equipment sends a registration request message or parameter to an access network device of the second communications network. The access network device of the second communications network receives the registration request message or parameter sent by the user equipment.

Based on the foregoing embodiment, the registration request message or parameter further includes PDU session establishment request information, and the PDU session establishment request information includes second multi-access indication information and a session identifier. The second multi-access indication information is used to indicate that the user equipment requests to establish a multi-access PDU session for a session service corresponding to the session identifier.

Step 302: The access network device selects an AMF of the first communications network based on the identification information.

Step 303: The access network device sends a first transmission message to the AMF. The AMF receives the first transmission message sent by the access network device.

Based on the foregoing embodiment, the first transmission message further includes the PDU session establishment request information.

Step 304: The AMF determines, based on the access type indication information and the identification information, or the first multi-access indication information and the identification information, that the user equipment has registered with the first communications network and has initiated registration with the second communications network.

Step 305: The AMF performs a procedure of registering the user equipment with the second communications network.

For detailed descriptions of step 301 to step 305, refer to FIG. 4 and FIG. 5. Details are not described herein again.

Step 306: The AMF sends a second transmission message to the SMF. The SMF receives the second transmission message sent by the AMF.

The second transmission message may be specifically an N 11 interface transmission message, or may be another message. This is not limited in this embodiment of the present disclosure. The second transmission message includes a permanent identifier of the user equipment and PDU session establishment request information. The PDU session establishment request information includes a session identifier (PDU session ID) and the second multi-access indication information. The second multi-access indication information is used to indicate that the user equipment requests to establish a multi-access PDU session for a session service corresponding to the session identifier.

Step 307: The SMF obtains subscription information of the user equipment based on a permanent identifier of the user equipment.

Step 308: The SMF determines, based on session service subscription data in the subscription information, whether establishment of a multi-access PDU session for a session service corresponding to the session identifier is allowed, and if yes, step 309 is performed, or if no, step 310 is performed.

Step 309: The SMF sends a PDU session establishment or update request message to a UPF, where the PDU session establishment or update request message is used to indicate that the UPF creates a tunnel identifier corresponding to an access network side of the second communications network for the session service, for example, an F-TEID (IP address-Tunnel Endpoint Identifier).

The UPF is a UPF stored in context information of the user equipment. To be specific, the SMF searches for a UPF corresponding to a same PDU connection of the first communications network based on a PDU session ID; and the UPF creates the tunnel identifier corresponding to the access network side of the second communications network for the session service based on the PDU session establishment or update request message, and sends the tunnel identifier to the access network device of the second communications network, to establish a tunnel between the access network device of the second communications network and the UPF, and establish a multi-access session.

Step 310: The SMF sends a PDU session update or establishment request message to the UPF, where the PDU session update or establishment request message is used to indicate that the UPF updates an access network side tunnel identifier of the session service. The UPF receives the PDU session update or establishment request message sent by the SMF.

Specifically, the updating the access network side tunnel identifier of the session service includes storing a tunnel identifier corresponding to an access network side of the second communications network, and deleting or updating a tunnel identifier corresponding to an access network side of the first communications network.

Step 311: The UPF sends a connection establishment reply message to the SMF. The SMF receives the connection establishment reply message sent by the UPF.

Optionally, the second transmission message further includes third multi-access indication information, and the third multi-access indication information includes any one of a multi-access registration indication, a multi-access allowed indication, and a multi-access status indication. The multi-access registration indication is used to indicate that the user equipment performs multi-access registration with the first communications network and the second communications network. The multi-access allowed indication is used to indicate that the user equipment is allowed to access both the first communications network and the second communications network. The multi-access status indication is used to indicate a state in which the user equipment accesses both the first communications network and the second communications network. Correspondingly, step 308 may be: determining, by the SMF based on the third multi-access indication information and the session service subscription data in the subscription information, whether establishment of a multi-access PDU session for the session service corresponding to the session identifier is allowed.

In this embodiment, the multi-access registration of the user equipment in the first communications network and the second communications network can be implemented, and based on this, the multi-access session can be further established.

The embodiment shown in FIG. 4 when an application scenario is that the access network device of the first communications network is an N3IWF and the access network device of the second communications network is a RAN device is described below by using a specific embodiment.

Figure 7:
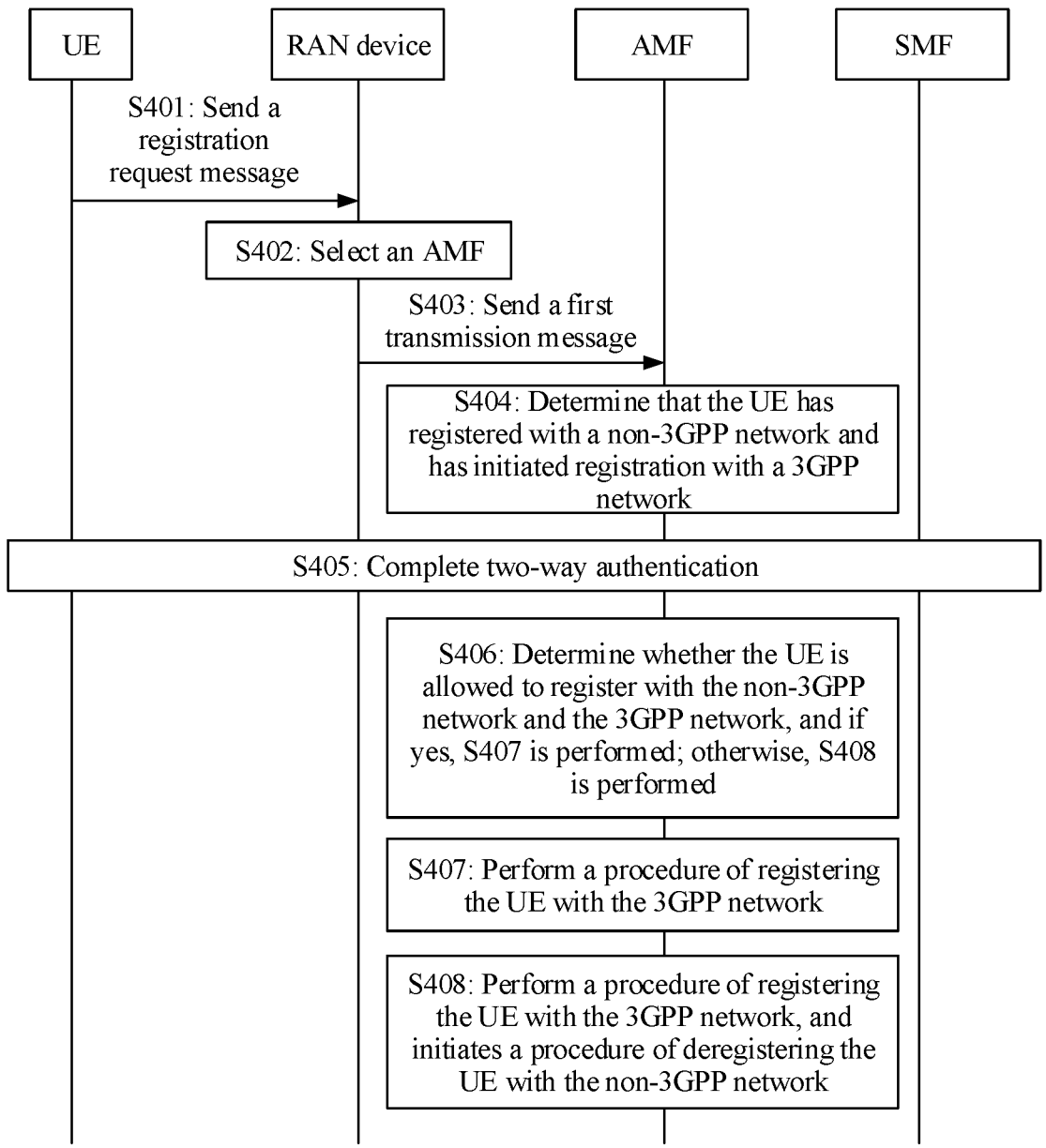
FIG. 7 is a flowchart of a connection processing method in another multi-access scenario according to an embodiment of the present disclosure.

FIG. 7 is a flowchart of a connection processing method in another multi-access scenario according to an embodiment of the present disclosure. As shown in FIG. 7, the method in this embodiment may include the following steps.

S401: When UE successfully registers with a non-3GPP network and needs to register with a 3GPP network, the UE sends a registration request message to a RAN device. The RAN device receives the registration request message sent by the UE.

The registration request message may include first multi-access indication information and identification information. For details, refer to detailed descriptions in the foregoing embodiment. Details are not described herein again.

S402: The RAN device selects an AMF of a non-3GPP network based on the identification information.

S403: The RAN device sends a first transmission message to the AMF. The AMF receives the first transmission message sent by the RAN device.

The first transmission message includes the registration request message and access type indication (Radio Access type, RAT type) information.

S404: The AMF determines, based on access type indication information and identification information, or based on first multi-access indication information and identification information, that the UE has registered with the non-3GPP network and has initiated registration with the 3GPP network.

S405: The UE and a network side complete two-way authentication.

S406: The AMF determines, based on subscription information of the UE, whether the UE is allowed to register with the non-3GPP network and the 3GPP network, and if yes, S407 is performed; otherwise, S408 is performed.

S407: The AMF performs a procedure of registering the UE with the 3GPP network.

S408: The AMF performs a procedure of registering the UE with the 3GPP network, and initiates a procedure of deregistering the UE with the non-3GPP network or delete a registration state of the UE in the non-3GPP network.

A specific implementation of initiating the procedure of deregistering the UE with the non-3GPP network or deleting the registration state of the UE in the non-3GPP network may be: sending, by the AMF, a deregistration request message to an N3IWF, where the deregistration request message may include information about a permanent identifier or a temporary identifier of the UE or the like, and deleting, by the N3IWF, context information of the UE based on the deregistration request message, releasing a connection between the N3IWF and the UPF, and sending a deregistration response message to the AMF.

In this embodiment, when the UE needs to connect to and register with the 3GPP network after successfully registering with the non-3GPP network, it can be determined, based on the subscription information of the UE, whether the UE is allowed to perform multi-access registration in the 3GPP network and the non-3GPP network, so that a requirement of multi-access registration of the UE in the 3GPP network and the non-3GPP network is met.

The embodiment shown in FIG. 4 when an application scenario is that an access network device of a first communications network is a RAN device and an access network device of a second communications network is an N3IWF is described below by using a specific embodiment.

Figure 8A:
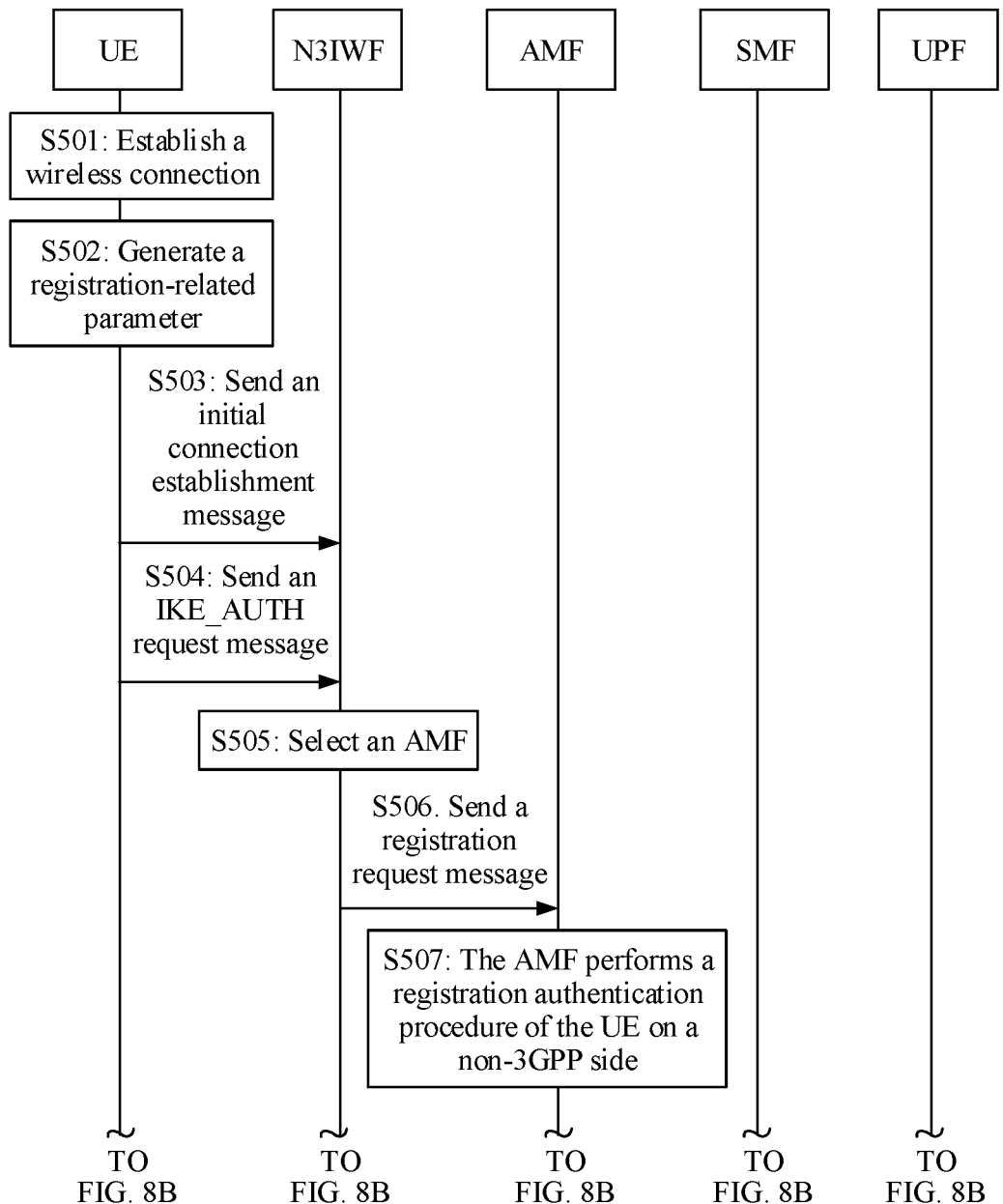
FIG. 8A and FIG. 8B are a flowchart of a connection processing method in another multi-access scenario according to an embodiment of the present disclosure.
Figure 8B:
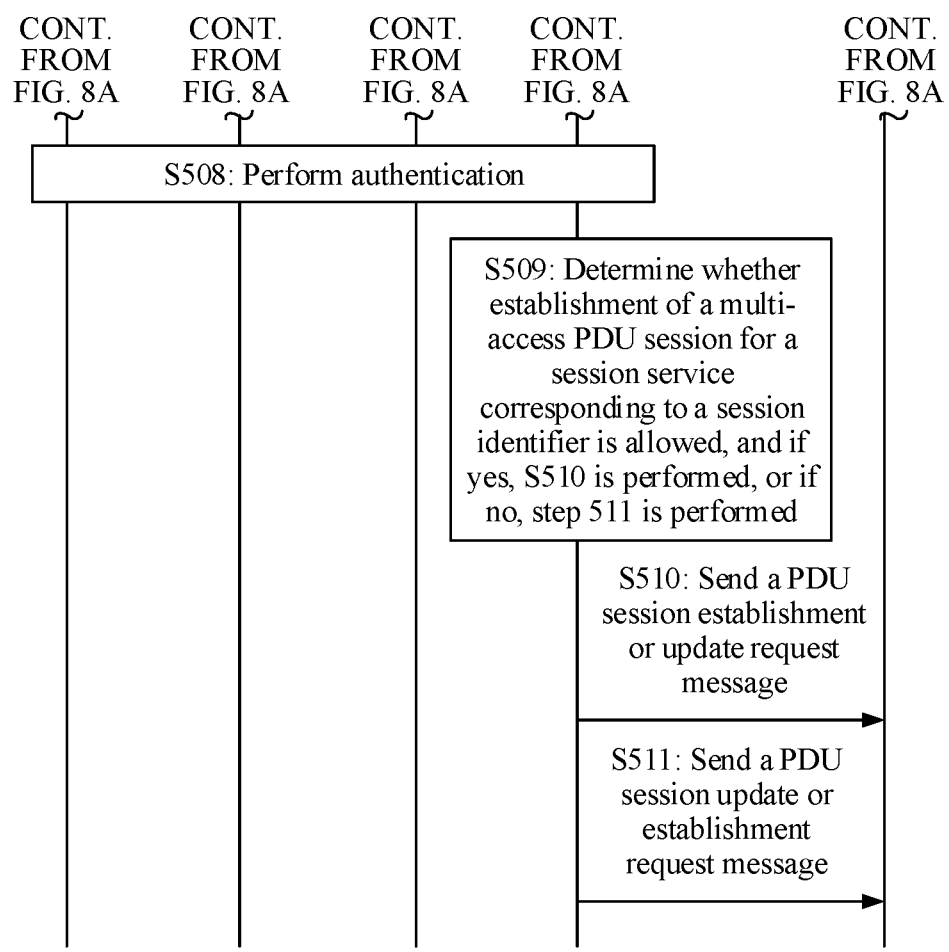

FIG. 8A and FIG. 8B are a flowchart of a connection processing method in another multi-access scenario according to an embodiment of the present disclosure. In this embodiment, UE first establishes a connection to a network side by using a 3GPP access network (such as a RAN), and completes a registration procedure of the UE on the network side. Subsequently, the UE establishes a connection to a non-3GPP access network (such as a WLAN access network), and initiates a registration procedure on a non-3GPP side. As shown in FIG. 8A and FIG. 8B, the method in this embodiment may include the following steps.

S501: UE finds a non-3GPP access network, and the UE establishes a wireless connection to the non-3GPP access network.

S502: The UE initiates a registration procedure on a non-3GPP side, and generates a registration-related parameter.

The registration-related parameter may include first multi-access indication information and identification information.

Specifically, for a manner of setting the parameter, refer to the embodiment shown in FIG. 4. Details are not described herein again.

It may be understood that, if the UE also initiates a session connection establishment procedure in the registration procedure, the registration-related parameter further includes PDU connection request information. For details of the PDU connection request information, refer to descriptions of the embodiment shown in FIG. 5.

S503: The UE sends an IKE_SA_INIT initial connection establishment message to an N3IWF. The N3IWF receives the IKE_SA_INIT initial connection establishment message sent by the UE.

The IKE_SA_INIT initial connection establishment message is used to negotiate an IPSec tunnel security-related parameter between the UE and the N3IWF, so that an IPSec tunnel is established between the UE and the N3IWF.

S504: The UE sends an IKE_AUTH request message to the N3IWF. The N3IWF receives the IKE_AUTH request message sent by the UE.

The IKE_AUTH request message includes the registration-related parameter generated in S502.

S505: The N3IWF selects an AMF based on identification information.

S506: The N3WIF sends a registration request message to the AMF. The AMF receives the registration request message sent by the N3WIF.

The registration request message is specifically added to a first transmission message and sent to the AMF. In this embodiment of the present disclosure, a name of the first transmission message including the registration request message is not limited. For example, the first transmission message may also be referred to as a NAS transmission message, an uplink NAS transmission message, an authentication request message, or the like. The registration request message includes the registration-related parameter generated in S502. In addition, the N3IWF sets, in the first transmission message, an access type access type to non-3GPP access, WLAN access, untrusted WLAN access, or the like.

S507: The AMF performs a registration authentication procedure of the UE on the non-3GPP side.

For a specific implementation of S507, refer to detailed descriptions of step 204 to step 207. Details are not described herein again.

S508: A network side authenticates the UE.

If the first transmission message in S506 includes PDU connection request information, the following steps further need to be performed.

S509: An SMF determines, based on session service subscription data in the subscription information, whether establishment of a multi-access PDU session for a session service corresponding to the session identifier is allowed, and if yes, S510 is performed, or if no, step 511 is performed.

S510: The SMF sends a PDU session establishment or update request message to a UPF, where the PDU session establishment or update request message is used to indicate that the UPF creates a tunnel identifier corresponding to a side of the non-3GPP access network for the session service, for example, an F-TEID. The UPF receives the PDU session establishment or update request message sent by the SMF.

S511: The SMF sends a PDU session update or establishment request message to the UPF, where the PDU session update or establishment request message is used to indicate that the UPF updates an access network side tunnel identifier of the session service. The UPF receives the PDU session update or establishment request message sent by the SMF.

Specifically, the updating the access network side tunnel identifier of the session service includes storing a tunnel identifier corresponding to a side of the non-3GPP access network, and deleting or updating a tunnel identifier corresponding to a side of a 3GPP access network.

In this embodiment, when the UE needs to connect to and register with a non-3GPP network after successfully registering with a 3GPP network, it can be determined, based on the subscription information of the UE, whether the UE is allowed to perform multi-access registration in the 3GPP network and the non-3GPP network, so that a requirement of multi-access registration of the UE in the 3GPP network and the non-3GPP network is met. In addition, a multi-access session is further established.

Based on any one of the foregoing embodiments, the multi-access registration of the user equipment in the first communications network and the second communications network is implemented. Subsequently, in a process of establishing the multi-access session, the session management functional entity may further send the correspondence between the access type information and the access network side tunnel identifier to the user plane functional entity UPF. Alternatively, the session management functional entity sends the data packet forwarding rule and the correspondence between access type information and the access network side tunnel identifier to the UPF. The data packet forwarding rule includes the correspondence between the data flow description information and the access type information. The user plane functional entity may store the correspondence between the access type information and the access network side tunnel identifier, or store the data packet forwarding rule and the correspondence between the access type information and the access network side tunnel identifier. The foregoing stored information may be used for subsequent data forwarding. For a specific method performed by the user plane functional entity, refer to the following method performed by the user plane functional entity in the embodiment shown in FIG. 13A and FIG. 13B.

The session management functional entity may further send fifth multi-access indication information and the session identifier to the mobility management functional entity. The fifth multi-access indication information is used to indicate that a session corresponding to the session identifier is a multi-access PDU session. The mobility management functional entity may mark the session corresponding to the session identifier as a multi-access PDU session based on the fifth multi-access indication information.

The session management functional entity may further send seventh multi-access indication information, the session identifier, and the access type information to a policy control functional entity PCF, where the seventh multi-access indication information is used to indicate that a PDU session corresponding to the session identifier is a multi-access PDU session; or the session management functional entity may further send a fourth transmission message to the PCF, where the fourth transmission message includes the session identifier, access type information of a first communications network, and access type information of a second communications network, and the access type information of the first communications network and the access type information of the second communications network are used to indicate that the PCF stores a binding relationship between the session identifier and the access type information of the first communications network and the access type information of the second communications network. For a specific method performed by the PCF, refer to the following method performed by the PCF in the embodiment shown in FIG. 13A and FIG. 13B.

Figure 13A:
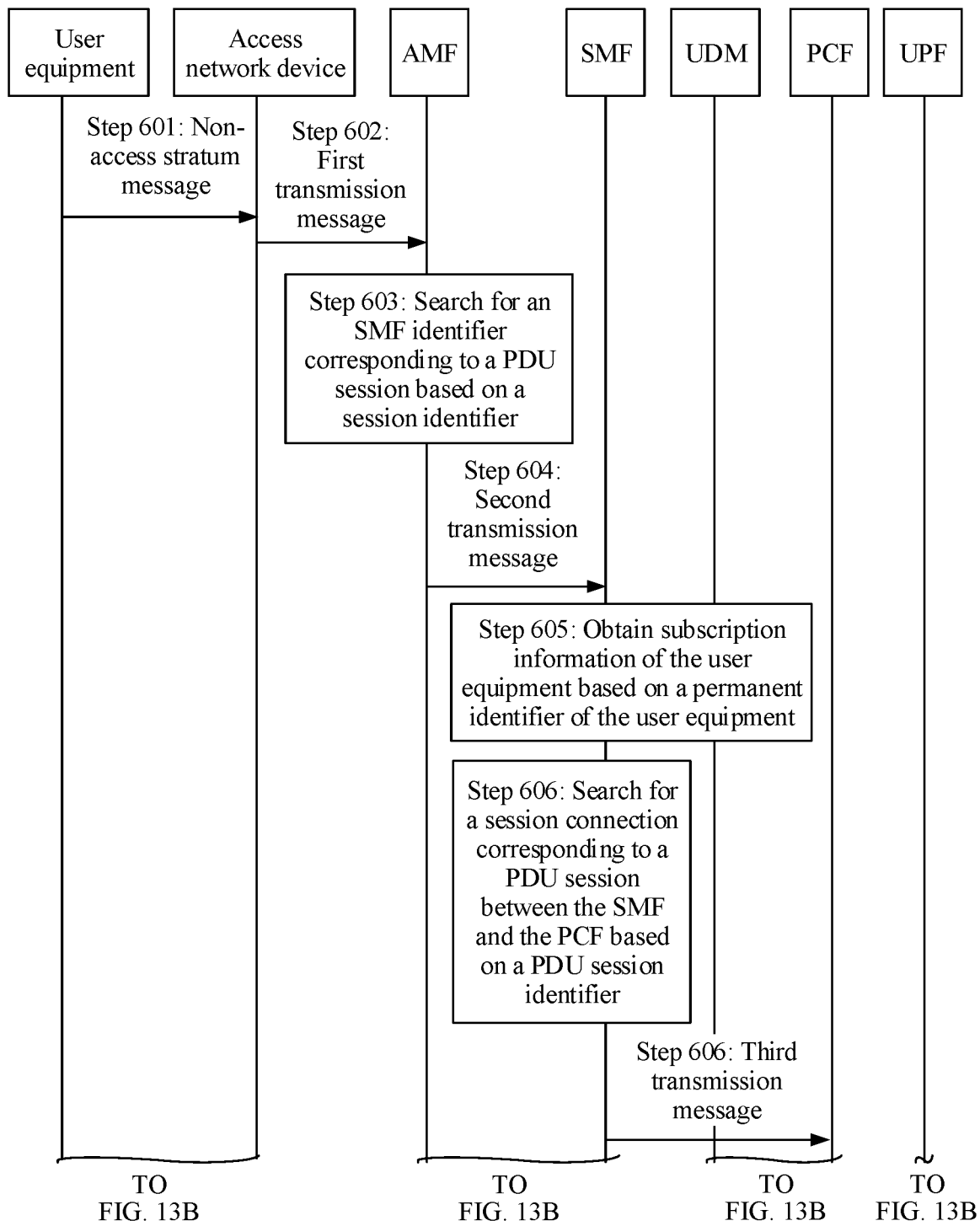
FIG. 13A and FIG. 13B are a flowchart of a connection processing method in another multi-access scenario according to an embodiment of the present disclosure.
Figure 13B:
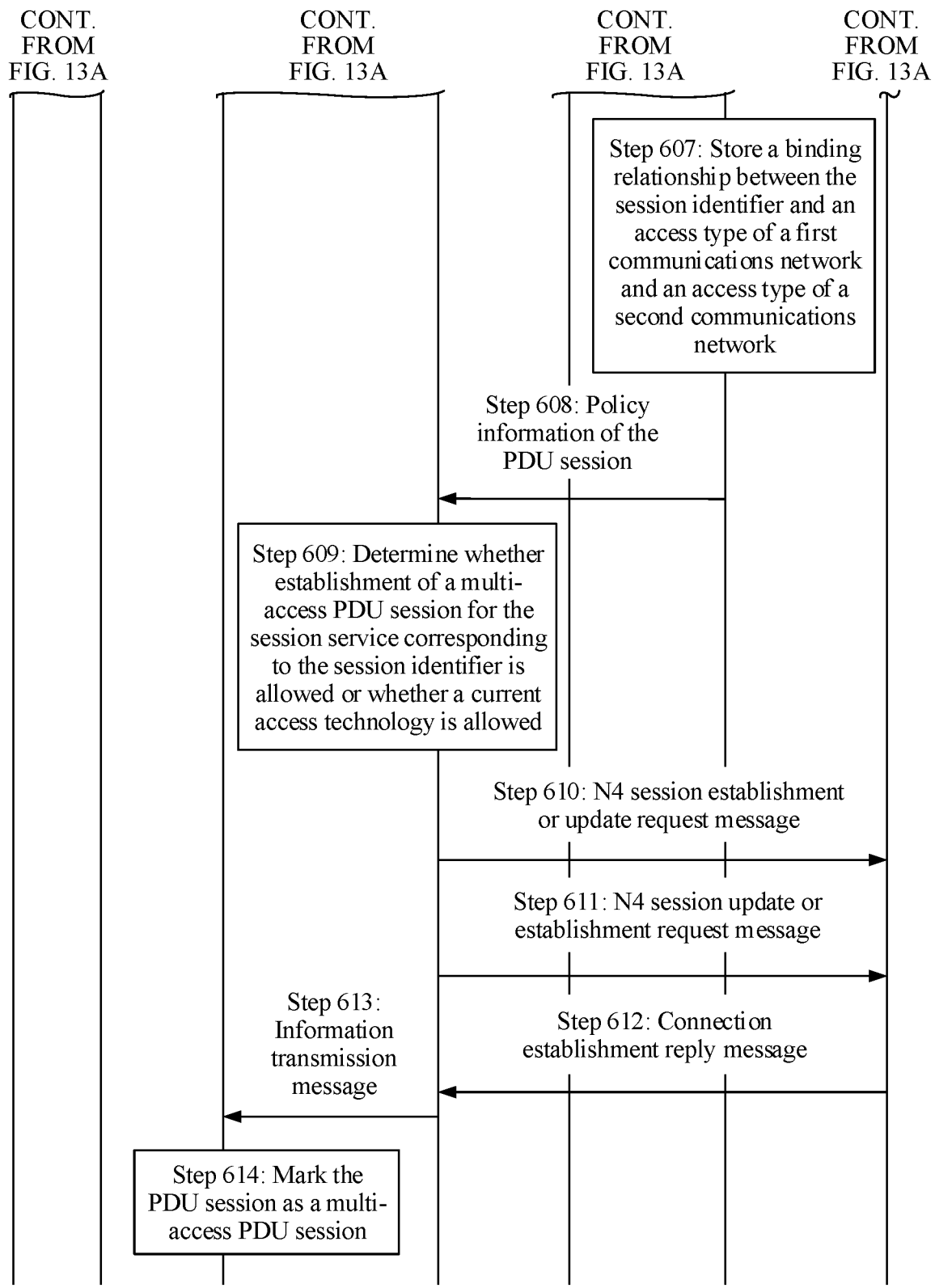

For a specific method performed by the session management functional entity, refer to the following method performed by the session management functional entity in the embodiment shown in FIG. 13A and FIG. 13B.

Figure 9:
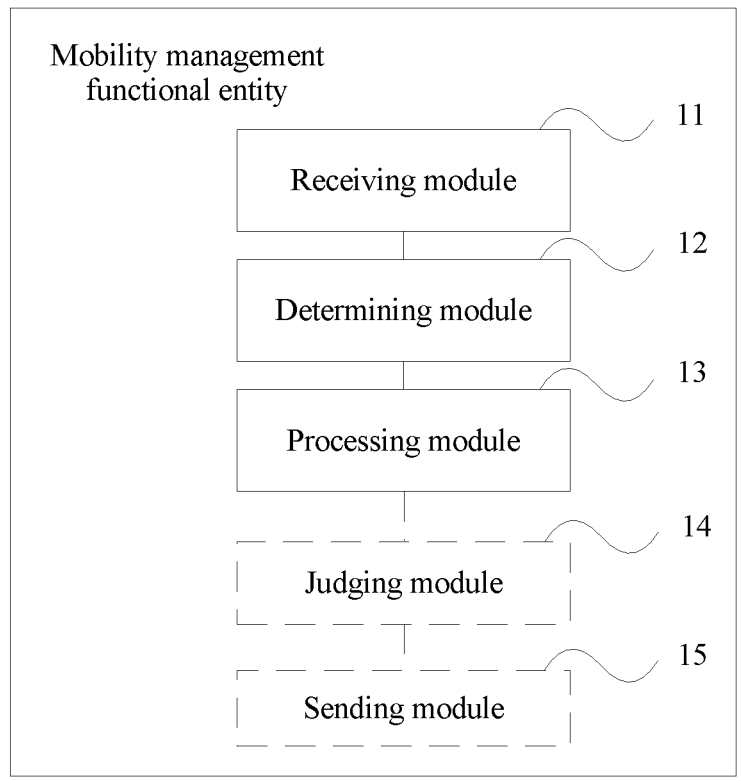
FIG. 9 is a schematic structural diagram of a mobility management functional entity according to an embodiment of the present disclosure.

FIG. 9 is a schematic structural diagram of a mobility management functional entity according to an embodiment of the present disclosure. As shown in FIG. 9, the apparatus in this embodiment may include a receiving module 11, a determining module 12, and a processing module 13. The receiving module 11 is configured to receive a first transmission message sent by an access network device, where the first transmission message includes a registration request message, the registration request message includes first multi-access indication information and identification information, and the identification information is used for at least one of obtaining context information of user equipment and selecting a network functional entity. The determining module 12 is configured to determine, based on the first multi-access indication information and the identification information, that the user equipment has registered with a first communications network and has initiated registration with a second communications network. The processing module 13 is configured to perform a procedure of registering the user equipment with the second communications network.

Optionally, the determining module 12 may be specifically configured to: obtain the context information of the user equipment based on the identification information; determine, based on the context information of the user equipment, that the user equipment has registered with the first communications network; and determine, based on the first multi-access indication information, that the user equipment has initiated registration with the second communications network.

Optionally, the first transmission message further includes access type indication information; and the determining module 12 is specifically configured to determine, based on the access type indication information, the first multi-access indication information, and the identification information, that the user equipment has registered with the first communications network and has initiated registration with the second communications network.

Optionally, the apparatus in this embodiment may further include a judging module 14. The judging module 14 is configured to: before the mobility management functional entity performs the procedure of registering the user equipment with the second communications network, determine, based on subscription information of the user equipment, that the user equipment is allowed to register with the first communications network and the second communications network.

Optionally, the judging module 14 is further configured to: if the judging module 14 determines, based on the subscription information of the user equipment or local configuration information, that the user equipment is not allowed to register with the first communications network and the second communications network, perform, by the processing module 13, the procedure of registering the user equipment with the second communications network, and initiate a procedure of deregistering the user equipment with the first communications network or delete a registration state of the user equipment in the first communications network.

Optionally, the registration request message further includes second multi-access indication information, and the mobility management functional entity further includes a sending module 15. The sending module 15 is configured to send a second transmission message to the session management functional entity, where the second transmission message includes a permanent identifier of the user equipment and PDU session establishment request information, the PDU session establishment request information includes a session identifier and the second multi-access indication information, and the second multi-access indication information is used to indicate that the user equipment requests to establish a multi-access PDU session for a session service corresponding to the session identifier.

The apparatus in this embodiment may be configured to perform the technical solutions of the foregoing method embodiments. Implementation principles and technical effects of the apparatus are similar to those of the foregoing method embodiments. Details are not described herein again.

Figure 10:
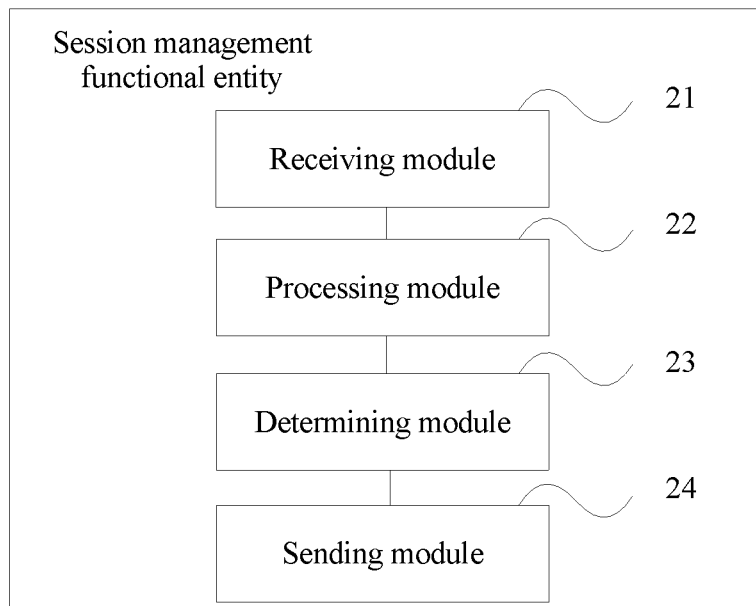
FIG. 10 is a schematic structural diagram of a session management functional entity according to an embodiment of the present disclosure.

FIG. 10 is a schematic structural diagram of a session management functional entity according to an embodiment of the present disclosure. As shown in FIG. 10, the apparatus in this embodiment may include a receiving module 21 and a processing module 22. The receiving module 21 is configured to receive a second transmission message sent by a mobility management functional entity, where the second transmission message includes a permanent identifier of user equipment and PDU session establishment request information, the PDU session establishment request information includes a session identifier and second multi-access indication information, and the second multi-access indication information is used to indicate that the user equipment requests to establish a multi-access PDU session for a session service corresponding to the session identifier. The processing module 22 is configured to establish, based on the PDU session establishment request information, a multi-access session for the session service corresponding to the session identifier.

Optionally, the session management functional entity further includes a determining module 23. The determining module 23 is configured to: before the multi-access session is established, based on the PDU session establishment request information, for the session service corresponding to the session identifier, obtain subscription information of the user equipment based on a permanent identifier of the user equipment; and determine, based on session service subscription data in the subscription information, that establishment of a multi-access PDU session for the session service corresponding to the session identifier is allowed.

Optionally, the second transmission message further includes a third multi-access indication; and the processing module 22 is further configured to determine, based on the third multi-access indication information, that establishment of the multi-access PDU session for the session service corresponding to the session identifier is allowed.

Optionally, the session management functional entity further includes a sending module 24; and the sending module 24 is configured to initiate a PDU session establishment or update procedure to a user plane functional entity (UPF), where the PDU session establishment or update procedure includes sending, by the session management functional entity, a PDU session establishment or update request message, and the PDU session establishment or update request message is used to indicate that the UPF creates a tunnel identifier corresponding to an access network side of a second communications network for the session service.

Optionally, if the session management functional entity determines, based on the session service subscription data in the subscription information, that the multi-access PDU session is not allowed to be established for the session service corresponding to the session identifier, the sending module 24 is further configured to initiate a PDU session update or establishment procedure to a UPF. The PDU session update procedure includes sending, by the session management functional entity, a PDU session update or establishment request message. The PDU session update or establishment request message is used to indicate that the UPF updates an access network side tunnel identifier of the session service. The updating the access network side tunnel identifier of the session service includes storing a tunnel identifier corresponding to an access network side of a second communications network, and deleting or updating a tunnel identifier corresponding to an access network side of a first communications network.

The apparatus in this embodiment may be configured to perform the technical solutions of the foregoing method embodiments. Implementation principles and technical effects of the apparatus are similar to those of the foregoing method embodiments. Details are not described herein again.

Figure 11:
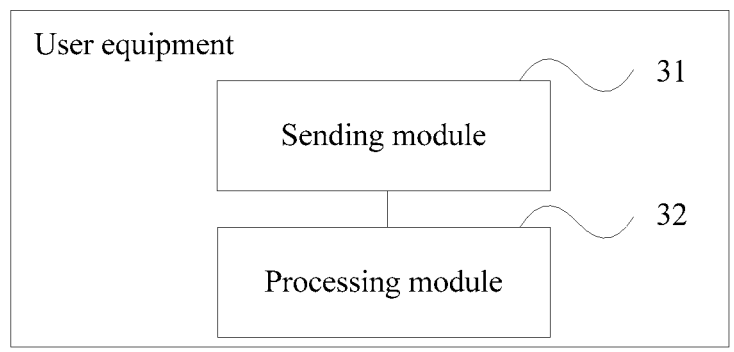
FIG. 11 is a schematic structural diagram of user equipment according to an embodiment of the present disclosure.

FIG. 11 is a schematic structural diagram of user equipment according to an embodiment of the present disclosure. As shown in FIG. 11, the apparatus in this embodiment may include a sending module 31 and a processing module 32. The processing module 32 is configured to: when the user equipment successfully registers with a first communications network and needs to register with a second communications network, send, by using the sending module 31, a registration request message to an access network device of the second communications network. The registration request message includes first multi-access indication information and identification information. The first multi-access indication information is used for network side access and is used by a mobility management functional entity mobility management functional entity to perform, based on the first multi-access indication information and the identification information, registration of the user equipment in the second communications network. The identification information is used for at least one of selecting a network functional entity and obtaining context information of the user equipment.

Optionally, the registration request message further includes second multi-access indication information. The second multi-access indication information is used by a session management functional entity to establish, based on the second access indication information, a multi-access session after the user equipment successfully registers with the second communications network.

The apparatus in this embodiment may be configured to perform the technical solutions of the foregoing method embodiments. Implementation principles and technical effects of the apparatus are similar to those of the foregoing method embodiments. Details are not described herein again.

For a detailed process of interaction between each apparatus and another communications network element, refer to descriptions of the foregoing method embodiments. For beneficial effects of each apparatus, refer to beneficial effects of the foregoing method embodiments. Details are not described herein again.

Figure 12:
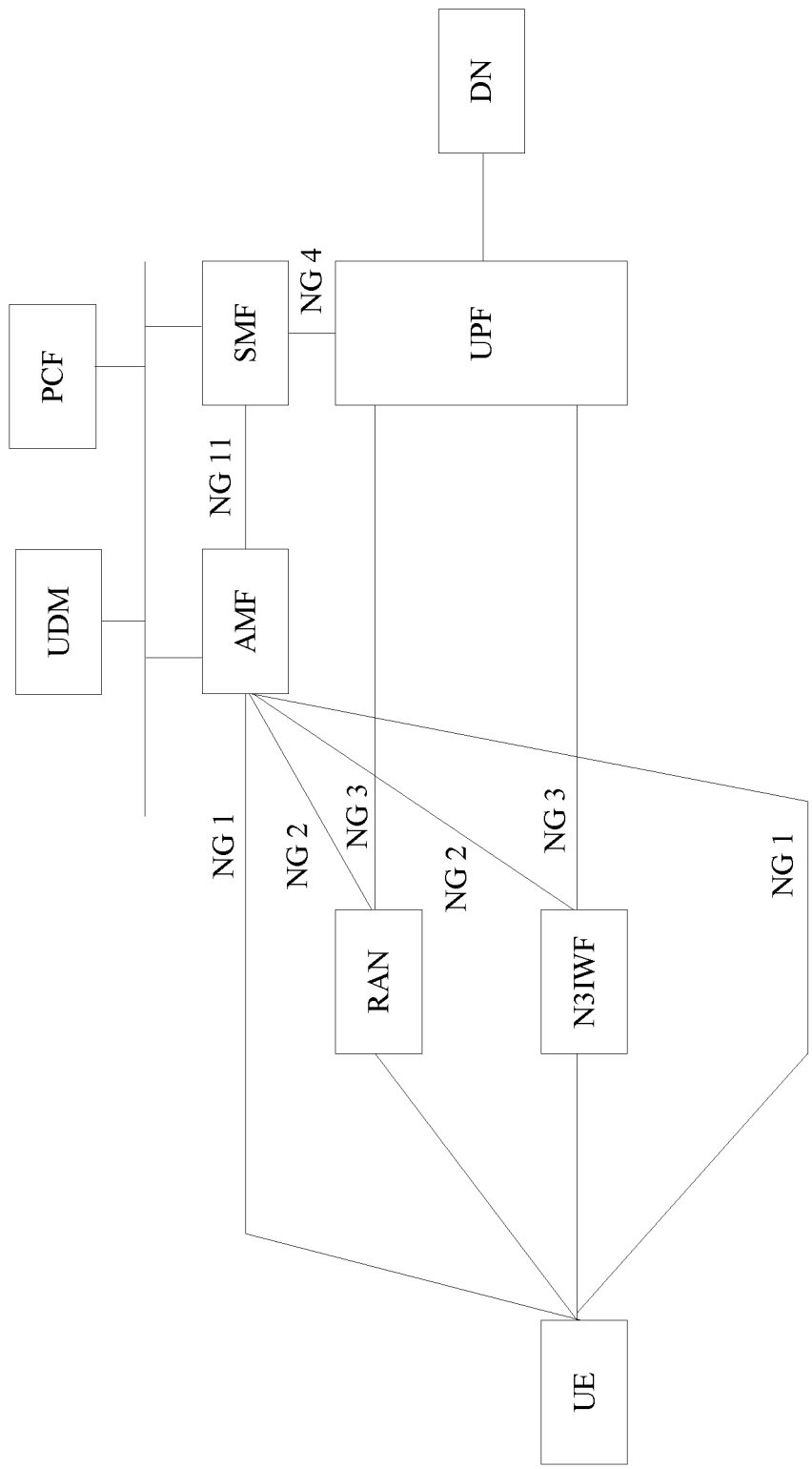
FIG. 12 is a schematic diagram of another system architecture according to an embodiment of the present disclosure.

FIG. 12 is a schematic diagram of another system architecture according to an embodiment of the present disclosure. The system architecture shown in FIG. 12 may be a specific representation form of the communications system shown in FIG. 1. As shown in FIG. 12, the system architecture in this embodiment may be referred to as a 5G network architecture. The network architecture supports not only a wireless technology (for example, LTE or 5G RAN) defined by the 3GPP standard group in accessing a core network side, where the core network side in this embodiment of the present disclosure may be referred to as a 5G core network side, but also a non-3GPP access technology in accessing the core network side by using a non-3GPP interworking functional entity (N3IWF), a next-generation access gateway (ngPDG), a fixed network access gateway, or a trusted non-3GPP access gateway. In other words, the system architecture in this embodiment of the present disclosure supports UE in accessing a 5G core network side by using different access technologies. Core network functions are classified into a user plane network element functional entity (UPF) and a control plane network element functional entity (CPF). The user plane network element functional entity is mainly responsible for packet data packet forwarding, QoS control, charging information collection, or the like. The control plane network element functional entity is mainly responsible for user registration and authentication, mobility management, delivering a data packet forward policy to a user plane (UPF), a QoS control policy, or the like. The CPF may be further subdivided into an access and mobility management functional entity (AMF) and a session management functional entity (SMF). Specifically, the AMF is responsible for performing a registration procedure during user access and location management in a user movement process. The SMF is responsible for establishing a corresponding session connection on the core network side when a user initiates a service, and providing a specific service or the like for the user. In addition, the core network side may further include an independent policy control functional entity (PCF) and a user subscription data management functional entity (SDM/UDM). User subscription data is stored in the SDM/UDM.

Specifically, as shown in FIG. 12, the UE may be connected to the AMF by using a RAN and/or an N3IWF. The AMF is separately connected to the SMF, the SDM/UDM, and the PCF. The SMF is separately connected to the AMF, the SDM/UDM, the PCF, and the UPF. The UPF is connected to a data network (DN). The DN may be specifically the Internet, or may be an IMS network.

As shown in FIG. 12, interfaces and connections in the system architecture include: NG 1, NG 2, NG 3, NG 4, and NG 11. The NG 1 is a control plane connection between the user equipment and the AMF, and is used to transmit control signaling between the user equipment and a core network control plane. Specifically, a message on the NG 1 connection may be transmitted through a connection between the UE and the RAN and the NG 2 between the RAN and the AMF, or may be transmitted through a connection between the UE and the N3IWF and the NG 2 between the N3IWF and the AMF. The NG 2 is a control plane connection between the RAN and the AMF and a control plane between the N3IWF and the AMF, and is used to transmit control signaling between the core network control plane and the RAN or the N3IWF, and support the NG 1 connection between the UE and the core network control plane. The NG 3 is a connection between the RAN and the user plane function and a connection between the N3IWF and the user plane function, and is used to support a protocol data unit (PDU for short) session connection established for the user equipment. The NG 4 is a connection between the SMF and the user plane function, and is used to transfer control signaling between the SMF and the user plane function. The NG 11 is a connection between the AMF and the SMF, and is used to transmit control signaling related to a session service.

Specifically, the AMF, the SMF, the UPF, the PCF, the UDM, and the UE shown in FIG. 12 may perform steps in the foregoing method embodiment to establish a multi-access PDU session. For a specific implementation, refer to descriptions of the following embodiment.

FIG. 13A and FIG. 13B are a flowchart of a connection processing method in another multi-access scenario according to an embodiment of the present disclosure. This embodiment is used to establish a multi-access session. As shown in FIG. 13A and FIG. 13B, the method in this embodiment may include the following steps.

Step 601: User equipment sends a non-access stratum (NAS) message to an access network device. The access network device receives the non-access stratum (NAS) message sent by the user equipment.

The non-access stratum (NAS) message includes a multi-access PDU session parameter. The multi-access PDU session parameter is used to indicate that the user equipment requests to establish a multi-access PDU session. The non-access stratum (NAS) message may be a non-access stratum transport (NAS Transport) message or a service request message.

The user equipment may complete multi-access registration in a first communications network and a second communications network according to the embodiment shown in FIG. 4 or shown in FIG. 5. After the user equipment successfully registers with the first communications network and the second communications network, the user equipment may perform step 601 to request to establish a multi-access PDU session.

In an implementation, the user equipment may complete multi-access registration in the first communications network and the second communications network according to the embodiment shown in FIG. 4 or shown in FIG. 5. The user equipment initiates a PDU session establishment procedure in one of the first communications network and the second communications network. This is the same as an existing procedure. After the PDU session is established in one of the first communications network and the second communications network, the user equipment performs the step in this embodiment, to initiate the PDU session establishment procedure in the other communications network of the first communications network and the second communications network, in other words, add an access technology of the other communications network for the PDU session, to establish the multi-access PDU session. Alternatively, when the user equipment determines that the established PDU session is in activated mode, the user equipment establishes a multi-access session in the other communications network by performing the step in this embodiment. The foregoing access network device is an access network device of the other communications network of the first communications network and the second communications network.

Specifically, the user equipment sends a non-access stratum transport (NAS Transport) message to the access network device. The non-access stratum transport (NAS Transport) message may alternatively be replaced with another NAS message.

In an implementation, the non-access stratum transport (NAS Transport) message or the another NAS message includes a PDU session establishment request or PDU session update message. The PDU session establishment request and PDU session update message includes second multi-access indication information and a session identifier (PDU session ID). The PDU session establishment request and PDU session update message may be collectively referred to as a session management NAS (SM NAS) message.

In another implementation, the non-access stratum transport (NAS Transport) message or the another NAS message includes second multi-access indication information and a session identifier.

The second multi-access indication information is used to indicate that the user equipment requests to establish a multi-access PDU session for a session service corresponding to the session identifier. A specific implementation of the second multi-access indication information may be an additional access indication, a multi-access indication, or the like. This is not limited in this application. The session identifier is a session identifier of a PDU session that has been established by the user equipment in one of the first communications network and the second communications network. The following embodiment is described by using an example in which the PDU session is first successfully established in the first communications network, and then the user equipment initiates a multi-access session establishment procedure in the second communications network.

Optionally, the user equipment may determine whether the first communications network and the second communications network belong to a same PLMN. When determining that the first communications network and the second communications network belong to a same PLMN, the user equipment performs step 601, to initiate a multi-access PDU session establishment procedure.

Optionally, the user equipment may determine whether a PDU session has been established in the first communications network or the second communications network. When determining that a PDU session has been established, by the user equipment, in the first communications network or the second communications network, the user equipment performs step 601, to initiate a multi-access PDU session establishment procedure.

Optionally, the user equipment may determine whether the first communications network and the second communications network belong to a same PLMN, and determine whether a PDU session has been established in the first communications network or the second communications network. When the first communications network and the second communications network belong to a same PLMN, and the user equipment has established the PDU session in the first communications network or the second communications network, the user equipment performs step 601, to initiate a multi-access PDU session establishment procedure.

Step 602: The access network device sends a first transmission message to an AMF. The AMF receives the first transmission message sent by the access network device.

The first transmission message includes the non-access stratum transport (NAS Transport) message or another NAS message. For specific content included in the non-access stratum transport (NAS Transport) message or the another NAS message, refer to step 601. Details are not described herein again.

In other words, the user equipment sends the non-access stratum transport (NAS Transport) message or the another NAS message to the AMF by using a radio bearer of the access network device.

Step 603: The AMF searches for an SMF identifier corresponding to a PDU session based on a session identifier.

Step 604: The AMF sends a second transmission message to an SMF corresponding to the SMF identifier. The SMF receives the second transmission message sent by the AMF.

The second transmission message may be specifically an N11 interface transmission message, or an Nsmf_PDU Session_Update SMContext message (PDU session SM context update message), or may be another message. This is not limited in this embodiment of the present disclosure.

In an implementation, the second transmission message includes a permanent identifier of the user equipment and a PDU session establishment request message. The PDU session establishment request message includes a session identifier (PDU session ID) and the second multi-access indication information. The second multi-access indication information is used to indicate that the user equipment requests to establish a multi-access PDU session for a session service corresponding to the session identifier.

In another implementation, the second transmission message includes a permanent identifier of the user equipment, second multi-access indication information, and a session identifier (PDU session ID).

In other words, the AMF sends the second multi-access indication information and the session identifier to the SMF by using the second transmission message.

The second transmission message may further include access type information.

Optionally, the AMF determines, based on at least one of the second multi-access indication information, subscription information of the UE, policy information of the UE, or a multi-access registration state of the UE, whether addition of an access technology of another communications network for the PDU session is allowed, or whether access of the PDU session based on a current access technology is allowed. For example, when the UE is in the multi-access registration state, or when the UE is in the multi-access registration state in the same PLMN, the AMF allows addition of the access technology of the another communications network for the PDU session, or allows the PDU session to access the current access technology. Alternatively, based on the subscription information or the policy information of the UE, when a DN network (Data Network) corresponding to the PDU session allows access based on the access technology of the another communications network, or allows access based on a multi-access technology, the AMF allows addition of the access technology of the another communications network for the PDU session or allows the PDU session to access the current access technology. Alternatively, when the AMF receives the second multi-access indication information, the AMF allows addition of the access technology of the another communications network for the PDU session or allows the PDU session to access the current access technology.

Figure 14:
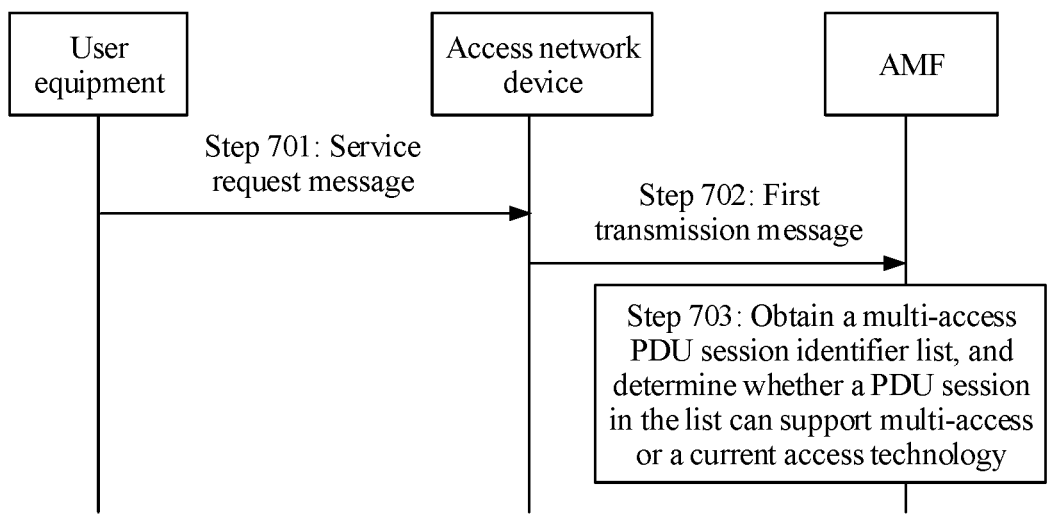
FIG. 14 is a flowchart of a connection processing method in another multi-access scenario according to an embodiment of the present disclosure.

The "current access technology" in this embodiment and the embodiment shown in FIG. 14 is specifically an access technology that is of a communications network and that is added by the user equipment for the PDU session, to establish the multi-access PDU session.

When the AMF allows establishment of a multi-access connection for the PDU session or allows the PDU session to access the current access technology, the AMF sends the second multi-access indication information to the SMF by using the second transmission message; or the AMF generates third multi-access indication information, and sends the third multi-access indication information to the SMF by using the second transmission message.

The third multi-access indication information includes any one of a multi-access registration indication, a multi-access allowed indication, a multi-access status indication, and a multi-access session indication. The multi-access registration indication is used to indicate that the user equipment performs multi-access registration with the first communications network and the second communications network. The multi-access allowed indication is used to indicate that the user equipment is allowed to access both the first communications network and the second communications network. The multi-access status indication is used to indicate a state in which the user equipment accesses both the first communications network and the second communications network.

Step 605: The SMF obtains subscription information of the user equipment based on a permanent identifier of the user equipment.

The SMF may obtain the subscription information of the user equipment from a UDM.

Specifically, the SMF sends sixth multi-access indication information and a session identifier to the UDM. Optionally, the SMF further sends at least one of access type information or radio access type (RAT type) information to the UDM. The sixth multi-access indication information is used to indicate that the PDU session is a multi-access session. The access type information or the RAT type information is used to indicate an access technology of the second communications network. The UDM sends subscription information corresponding to the access technology of the second communications network to the SMF, for example, sends charging policy subscription data of the user equipment in the access technology of the second communications network to the SMF.

Step 606: The SMF searches for a session connection corresponding to a PDU session between the SMF and a PCF based on the session identifier, and the SMF sends a third transmission message to the PCF through the session connection.

In an implementation, the third transmission message includes seventh multi-access indication information, a session identifier, and access type information of the second communications network. The seventh multi-access indication information indicates that the PDU session is a multi-access PDU session.

In another implementation, the third transmission message includes a session identifier, access type information of the first communications network, and access type information of the second communications network.

Step 607: The PCF stores a binding relationship between the session identifier and access type information of a first communications network and access type information of a second communications network.

Step 608: The PCF sends policy information of the PDU session to the SMF. The SMF receives the policy information that is of the PDU session and that is sent by the PCF.

Specifically, the policy information of the PDU session may include offload policy information. The offload policy information may include data flow description information and a corresponding policy. For example, the offload policy information may include data flow description information and access type information corresponding to the data flow description information.

Step 609: The SMF determines, based on at least one of session service subscription data in the subscription information, the policy information, second multi-access indication information, or third multi-access indication information, whether establishment of a multi-access PDU session for the session service corresponding to the session identifier is allowed or whether a current access technology is allowed, and if yes, step 610 is performed, or if no, step 611 is performed.

In an implementation, when a DN network (Data Network) corresponding to the PDU session allows access based on the access technology of the second communications network, or allows access based on a multi-access technology, the SMF allows, based on the session service subscription data in the subscription information or the policy information, addition of the access technology of the second communications network for the PDU session.

In another implementation, the SMF allows, based on the second multi-access indication information or the third multi-access indication information, addition of the access technology of the second communications network for the PDU session.

Step 610: The SMF sends an N4 session establishment or update request message to a UPF. The UPF receives the N4 session establishment or update request message sent by the SMF.

The N4 session establishment or update request message includes fourth multi-access indication information or access type information.

Specifically, the SMF searches for an N4 session connection corresponding to the PDU session based on the session identifier, and sends an N4 session establishment or update request message through the N4 session connection. The fourth multi-access indication information and the second multi-access indication information may be in a same parameter form, for example, an additional access indication, or may be in different parameter forms. The access type information indicates the access technology of the second communications network, for example, 3GPP access, non-3GPP access, trusted WLAN access, an untrusted WLAN access technology, 5G RAN access, a fixed network access technology, or an LTE access technology.

Optionally, when a plurality of UPFs serve the PDU session, in other words, when there are a plurality of UPFs on a tunnel of the PDU session, for example, including an uplink classifier UPF (ULCL UPF), a branching point UPF (Branching point UPF), or an anchor UPF (Anchor UPF), the SMF selects an N3-interface UPF, a ULCL UPF (Uplink Classifier UPF), a branching point UPF, or an anchor UPF to send a PDU session establishment or update request message, including fourth multi-access indication information or access type information, and adds access network tunnel information of the second communications network to the selected UPF.

The PDU session establishment or update request message, the fourth multi-access indication information, or the access type information is used to indicate that the UPF creates a tunnel identifier corresponding to an access network side of the second communications network for the session service, for example, an F-TEID (IP address-Tunnel Endpoint Identifier). To be specific, the UPF stores both an access network side tunnel identifier of the first communications network and an access network side tunnel identifier of the second communications network for the PDU session.

In addition, optionally, the SMF may further send a correspondence between the access type information and an access network side tunnel identifier to the UPF. The UPF stores a binding relationship between the access type information and an access-side tunnel identifier. Alternatively, the SMF sends a data packet forwarding rule to the UPF. The data packet forwarding rule includes a correspondence between the data flow description information (for example, at least one piece of 5-tuple information of a data packet) and the access type information. The UPF matches a data packet based on the data flow description information, searches for a corresponding access-side tunnel identifier based on the access type information, and sends the matching data packet to a corresponding access network side tunnel.

The UPF allocates a UPF-side tunnel identifier corresponding to the access network side of the second communications network to the session service based on the PDU session establishment or update request message or the fourth multi-access indication information and/or the access type information, and sends the tunnel identifier to an access network device of the second communications network, to establish a tunnel between the access network device of the second communications network and the UPF, and establish the multi-access session.

In addition, the UPF stores the access network side tunnel identifier of the first communications network and the access network side tunnel identifier of the second communications network for the PDU session based on the PDU session establishment or update request message, the fourth multi-access indication information, or the access type information.

Specifically, in an implementation, the UPF receives the fourth multi-access indication information sent by the SMF. The UPF stores the access network side tunnel identifier of the second communications network for the session service based on the fourth multi-access indication information. In addition, the UPF reserves the access network side tunnel identifier that is of the first communications network and that is stored when the session service accesses the first communications network. The UPF may further receive a correspondence that is sent by the SMF and that is between the access type information and the access network side tunnel identifier of the first communications network or the access network side tunnel identifier of the second communications network. The UPF stores the correspondence between the access type information and the access network side tunnel identifier of the first communications network or the access network side tunnel identifier of the second communications network.

In a data forwarding process, the UPF may further receive the data packet forwarding rule sent by the SMF, where the data packet forwarding rule includes the correspondence between the data flow description information and the access type information; the UPF stores the correspondence between the data flow description information and the access type information; the UPF receives a data packet, and determines access type information corresponding to the data packet based on the correspondence between the data flow description information and the access type information; and the UPF sends the data packet to an access network side tunnel corresponding to the access type information corresponding to the data packet based on the access type information corresponding to the data packet, and the correspondence between the access type information and the access network side tunnel identifier of the first communications network or the access network side tunnel identifier of the second communications network.

In another implementation, the UPF receives the access type information sent by the SMF. The UPF stores the access network side tunnel identifier of the second communications network for the session service based on the access type information. Specifically, the UPF determines whether the access network side tunnel identifier corresponding to the access type information has been stored. If the access network side tunnel identifier corresponding to the access type information has not been stored, the UPF stores the access network side tunnel identifier. Otherwise, the UPF searches for the previously stored access-side tunnel identifier based on an the access type information, and replaces an original access network side tunnel identifier with the foregoing access network side tunnel identifier. The UPF stores the access network side tunnel identifier of the first communications network, the access type information corresponding to the access network side tunnel identifier of the first communications network, the access network side tunnel identifier of the second communications network, and the access type information corresponding to the access network side tunnel identifier of the second communications network for the PDU session based on the access type information, in other words, stores a correspondence between a tunnel identifier and access type information.

In a data forwarding process, the UPF may further receive the data packet forwarding rule sent by the SMF, where the data packet forwarding rule includes the correspondence between the data flow description information and the access type information; the UPF stores the correspondence between the data flow description information and the access type information; the UPF receives a data packet, and determines access type information corresponding to the data packet based on the correspondence between the data flow description information and the access type information; and the UPF sends the data packet to an access network side tunnel corresponding to the access type information corresponding to the data packet based on the access type information of the data packet, and the access network side tunnel identifier of the first communications network, the access type information corresponding to the access network side tunnel identifier of the first communications network, the access network side tunnel identifier of the second communications network, and the access type information corresponding to the access network side tunnel identifier of the second communications network that are stored in the UPF.

Step 611: The SMF sends an N4 session update or establishment request message to the UPF if establishment of no multi-access session is allowed, where the N4 session update or establishment request message is used to indicate that the UPF updates an access network side tunnel identifier of the session service. The UPF receives the N4 session update or establishment request message sent by the SMF.

Specifically, the updating the access network side tunnel identifier of the session service includes storing a tunnel identifier corresponding to an access network side of the second communications network, and deleting or updating a tunnel identifier corresponding to an access network side of the first communications network.

Step 611 and step 610 are applicable to different scenarios, and are not triggered at the same time.

Step 612: The UPF sends a connection establishment reply message to the SMF. The SMF receives the connection establishment reply message sent by the UPF.

Step 613: The SMF sends an information transmission message, an Namf_Communication_N1N2MessageTransfer message, or an Nsmf_PDU Session_UpdateSMContext Response (PDU session SM context update and reply message) to the AMF.

Specifically, after the multi-access session is successfully established, the SMF sends the foregoing message. The message may include access type information and fifth multi-access indication information. The fifth multi-access indication information and the second multi-access indication information may be implemented in a same form, namely, an additional access indication, or in different parameter forms. The fifth multi-access indication information indicates that the AMF adds another access technology to the PDU session. The access technology is indicated by an access type. Alternatively, the foregoing message includes an additional access parameter, which indicates another newly added access technology. A value of the additional access parameter is 3GPP access, non-3GPP access, a 5G RAN, fixed network access, WLAN access, or the like.

Step 614: The AMF marks the PDU session as a multi-access PDU session. Alternatively, the AMF stores the binding relationship between the session identifier and the access type information of the first communications network and the access type information of the second communications network.

In this embodiment, the multi-access registration of the user equipment in the first communications network and the second communications network can be implemented, and based on this, the multi-access session can be further established.

FIG. 14 is a flowchart of a connection processing method in another multi-access scenario according to an embodiment of the present disclosure. In this embodiment, that the multi-access PDU session parameter in the embodiment shown in FIG. 13A and FIG. 13B is a service request message, and that the service request message includes a multi-access PDU session identifier list are described in detail. As shown in FIG. 14, the method in this embodiment may include the following steps.

Step 701: User equipment sends a service request message to an access network device. The access network device receives the service request message sent by the user equipment.

The user equipment may complete multi-access registration in a first communications network and a second communications network according to the embodiment shown in FIG. 4 or shown in FIG. 5. After the user equipment successfully registers with the first communications network and the second communications network, the user equipment initiates a PDU session establishment procedure in one of the first communications network and the second communications network. This is the same as an existing procedure. After a PDU session is established in one of the first communications network and the second communications network, and the user equipment determines that the first communications network and the second communications network belong to a same PLMN, the user equipment establishes a multi-access session in the other communications network of the first communications network and the second communications network by performing the step in this embodiment. Alternatively, when the user equipment determines that the established PDU session is in non-activated mode, the user equipment establishes a multi-access session in the other communications network by performing the step in this embodiment. Specifically, the user equipment sends a service request message to an AMF in the other communications network. The service request message includes a multi-access PDU session identifier list. The list includes a session identifier of at least one established PDU session. The list is used to indicate that the UE requests to add another access technology for a PDU session in the list, in other words, to change a PDU session into a multi-access PDU session.

Step 702: The access network device sends a first transmission message to an AMF. The AMF receives the first transmission message sent by the access network device.

The first transmission message includes the service request message.

Step 703: The AMF obtains a multi-access PDU session identifier list, and the AMF determines whether a PDU session in the list can support multi-access or determines whether access of the PDU session based on a current access technology is allowed.

Specifically, the AMF determines, based on at least one of subscription information of the UE, or policy information of the UE, or a multi-access registration state of the UE, whether addition of another access technology to the PDU is allowed, or whether access of the PDU session based on a current access technology is allowed. For example, when the UE is in the multi-access registration state, or when the UE is in the multi-access registration state in the same PLMN, the AMF allows addition of the another access technology for the PDU session, or allows the PDU session to access the current access technology. Alternatively, based on the subscription information or the policy information of the UE, when a DN network (Data Network) corresponding to the PDU session allows access based on the current access technology, or allows access based on a multi-access technology, the AMF allows addition of the another access technology for the PDU session or allows the PDU session to access the current access technology. Alternatively, the AMF obtains the multi-access PDU session identifier list, and the AMF allows addition of the another access technology for the PDU session or allows the PDU session to access the current access technology.

For the allowed PDU session, the AMF searches for an SMF identifier corresponding to the PDU session based on the session identifier, and sends a second transmission message to an SMF.

Specifically, the AMF searches for an SMF identifier corresponding to at least one PDU session based on the session identifier in the multi-access PDU session identifier list. When there are a plurality of PDU sessions in the multi-access PDU session identifier list, and the plurality of PDU sessions correspond to different SMF identifiers, in other words, correspond to different SMFs, the AMF may send a second transmission message to different SMFs separately, and each second transmission message includes a session identifier and third multi-access indication information. The session identifier is a session identifier of a PDU session being processed in the SMF, in other words, a PDU session identifier included in the multi-access PDU session identifier list. Each SMF establishes a multi-access PDU session for a PDU session based on a session identifier and third multi-access indication information.

For subsequent operations to be performed by each SMF, a UDM, a PCF, and a UPF in a multi-access PDU session establishment process, refer to step 605 to step 614. Details are not described herein again.

In this embodiment, the multi-access registration of the user equipment in the first communications network and the second communications network can be implemented, and based on this, the multi-access session can be further established. Particularly, when the established PDU session is in non-activated mode in the first communications network or the second communications network, the multi-access PDU session may be established in a communications network on the other side based on the foregoing procedure.

An embodiment of the present disclosure further provides user equipment. The user equipment is of a structure that is the same as that of the AMF shown in FIG. 3.

In this embodiment of the present disclosure, a processor of the user equipment is configured to perform the steps of the user equipment in the method embodiment of FIG. 13A and FIG. 13B or FIG. 14 by invoking a program or an instruction stored in a memory, so that multi-access registration of the user equipment in a first communications network and a second communications network is implemented, and further, a multi-access session can be established. For a specific implementation process, refer to the foregoing method embodiments.

An embodiment of the present disclosure further provides a UPF. The UPF is of a structure that is the same as that of the AMF shown in FIG. 3.

In this embodiment of the present disclosure, a processor of the UPF is configured to perform the steps of the UPF in the method embodiment of FIG. 13A and FIG. 13B or FIG. 14 by invoking a program or an instruction stored in a memory, so that multi-access registration of user equipment in a first communications network and a second communications network is implemented, and further, a multi-access session can be established. For a specific implementation process, refer to the foregoing method embodiments.

An embodiment of the present disclosure further provides an SMF. The SMF is of a structure that is the same as that of the AMF shown in FIG. 3.

In this embodiment of the present disclosure, a processor of the SMF is configured to perform the steps of the SMF in the method embodiment of FIG. 13A and FIG. 13B or FIG. 14 by invoking a program or an instruction stored in a memory, so that multi-access registration of user equipment in a first communications network and a second communications network is implemented, and further, a multi-access session can be established. For a specific implementation process, refer to the foregoing method embodiments.

Figure 15:
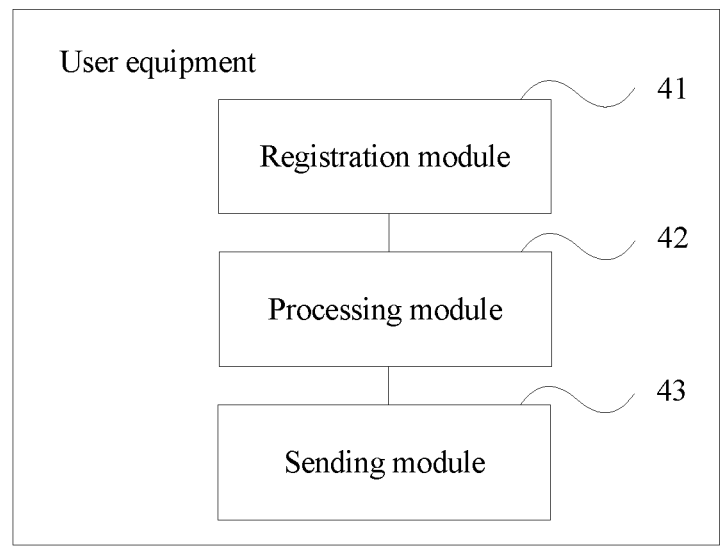
FIG. 15 is a schematic structural diagram of another user equipment according to an embodiment of the present disclosure.

FIG. 15 is a schematic structural diagram of another user equipment according to an embodiment of the present disclosure. As shown in FIG. 15, the apparatus in this embodiment may include a registration module 41, a processing module 42, and a sending module 43. The registration module 41 is configured to initiate registration with a first communications network and a second communications network. The processing module 42 is configured to: after the registration succeeds, send a non-access stratum message to a core-network network device by using the sending module 43. The non-access stratum message includes a multi-access PDU session parameter. The multi-access PDU session parameter is used to indicate that the user equipment requests to establish a multi-access PDU session.

Optionally, the multi-access PDU session parameter includes second multi-access indication information and a session identifier, and the second multi-access indication information is used to indicate that the user equipment requests to establish a multi-access PDU session for a session corresponding to the session identifier; or the multi-access PDU session parameter includes a multi-access PDU session identifier list, the multi-access PDU session identifier list includes at least one session identifier, and the multi-access PDU session identifier list is used to indicate that the user equipment requests to establish a multi-access PDU session for a session corresponding to each of the at least one session identifier.

Optionally, the processing module 42 is further configured to: before the non-access stratum message is sent to the core-network functional entity, determine whether the first communications network and the second communications network belong to a same PLMN; and/or determine that a PDU session has been established in the first communications network or the second communications network.

The apparatus in this embodiment may be configured to perform the technical solutions of the foregoing method embodiments. Implementation principles and technical effects of the apparatus are similar to those of the foregoing method embodiments. Details are not described herein again.

Figure 16:
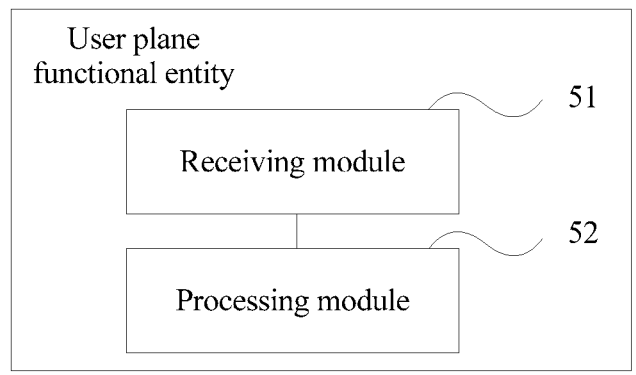
FIG. 16 is a schematic structural diagram of another user plane functional entity according to an embodiment of the present disclosure.

FIG. 16 is a schematic structural diagram of another user plane functional entity according to an embodiment of the present disclosure. As shown in FIG. 16, the apparatus in this embodiment may include a receiving module 51 and a processing module 52. The receiving module 51 is configured to receive fourth multi-access indication information sent by a session management functional entity SMF. The processing module 52 is configured to store an access network side tunnel identifier of a first communications network and an access network side tunnel identifier of a second communications network for a PDU session based on the fourth multi-access indication information.

Optionally, the receiving module 51 is further configured to: receive a correspondence between access type information sent by the SMF and the access network side tunnel identifier of the first communications network or the access network side tunnel identifier of the second communications network. The processing module 52 is further configured to store the correspondence between the access type information and an access network side tunnel identifier. The access network side tunnel identifier includes the access network side tunnel identifier of the first communications network or the access network side tunnel identifier of the second communications network.

Optionally, the receiving module 51 is further configured to receive a data packet forwarding rule sent by the SMF, where the data packet forwarding rule includes a correspondence between data flow description information and access type information. The processing module 52 stores the correspondence between the data flow description information and the access type information. The receiving module 51 is further configured to receive a data packet. The processing module 52 is further configured to: determine, based on a correspondence between the data flow description information and the access type information, access type information corresponding to the data packet; and send the data packet to an access network side tunnel corresponding to the access type information based on the access type information corresponding to the data packet and the correspondence between the access type information and the access network side tunnel identifier.

The apparatus in this embodiment may be configured to perform the technical solutions of the foregoing method embodiments. Implementation principles and technical effects of the apparatus are similar to those of the foregoing method embodiments. Details are not described herein again.

An embodiment of this application further provides another user plane functional entity. A structure of the user plane functional entity may be the same as that in FIG. 20. A receiving module is configured to receive access type information sent by a session management functional entity SMF. A processing module is configured to store a correspondence between an access network side tunnel identifier and the access type information for a PDU session based on the access type information, where the access network side tunnel identifier includes an access network side tunnel identifier of the first communications network or an access network side tunnel identifier of the second communications network.

Optionally, the receiving module is further configured to receive a data packet forwarding rule sent by the SMF, where the data packet forwarding rule includes a correspondence between data flow description information and access type information. The processing module is further configured to store the correspondence between the data flow description information and the access type information. The receiving module is further configured to receive a data packet. The processing module is further configured to: determine access type information corresponding to the data packet based on the correspondence between the data flow description information and the access type information; and send the data packet to an access network side tunnel corresponding to the access type information based on the access type information corresponding to the data packet, and the correspondence that is stored in the UPF and that is between the access network side tunnel identifier and the access type information.

The apparatus in this embodiment may be configured to perform the technical solutions of the foregoing method embodiments. Implementation principles and technical effects of the apparatus are similar to those of the foregoing method embodiments. Details are not described herein again.

Figure 17:
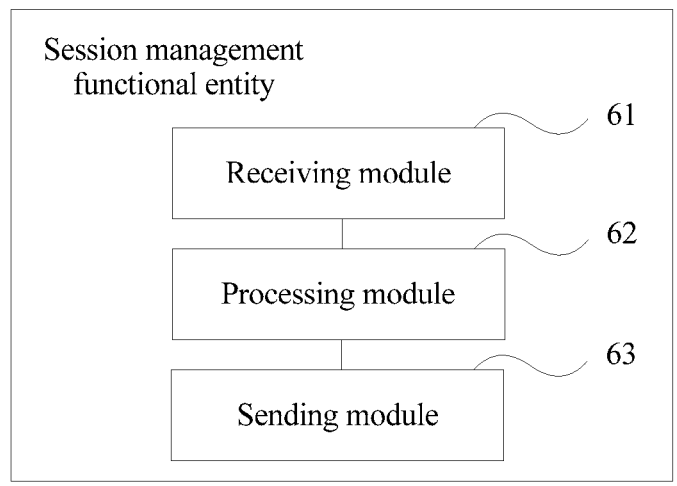
FIG. 17 is a schematic structural diagram of another session management functional entity according to an embodiment of the present disclosure.

FIG. 17 is a schematic structural diagram of another session management functional entity according to an embodiment of the present disclosure. As shown in FIG. 17, the apparatus in this embodiment may include a receiving module 61 and a processing module 62. The receiving module 61 is configured to receive a second transmission message sent by a mobility management functional entity, where the second transmission message includes a multi-access PDU session parameter, the multi-access PDU session parameter includes a PDU session establishment request message, and the PDU session establishment request message includes second multi-access indication information and a session identifier, or the multi-access PDU session parameter includes third multi-access indication information and the session identifier. The processing module 62 is configured to establish a multi-access PDU session for the user equipment based on the multi-access PDU session parameter, where the second multi-access indication information is used to indicate that the user equipment requests to establish a multi-access PDU session for a session service corresponding to the session identifier, and the third multi-access indication information is used to indicate that establishment of the multi-access PDU session for the session service corresponding to the session identifier is allowed.

Optionally, before the session management functional entity establishes the multi-access PDU session for the user equipment based on the multi-access PDU session parameter, the processing module 62 is further configured to obtain subscription information of the user equipment; and allow, based on at least one of the subscription information, policy information, the second multi-access indication information, or the third multi-access indication information, the multi-access PDU session to be established for the session service corresponding to the session identifier.

Optionally, the session management functional entity further includes a sending module 63. The sending module 63 is configured to send a session establishment or update message to a user plane functional entity UPF. The session establishment or update message is used to instruct the UPF to establish, for the session service, a tunnel identifier corresponding to an access network side of a second communications network.

Optionally, when the processing module determines, based on session service subscription data in the subscription information, that the multi-access PDU session is not allowed to be established for the session service corresponding to the session identifier, the sending module is further configured to send a session establishment or update message to a UPF. The session establishment or update message is used to instruct the UPF to update an access network side tunnel identifier of the session service, and the updating the access network side tunnel identifier of the session service includes storing a tunnel identifier corresponding to an access network side of a second communications network, and deleting or updating a tunnel identifier corresponding to an access network side of a first communications network.

Optionally, the processing module is further configured to search for a UPF corresponding to a PDU session based on the session identifier. The sending module is further configured to send the session establishment or update message to an N3-interface UPF, an uplink classifier UPF, a branching point UPF, or an anchor UPF from UPFs selected select by the processing module.

Optionally, the sending module is further configured to send fourth multi-access indication information and/or access type information to the UPF. The fourth multi-access indication information and/or the access type information is used to instruct to store access network side tunnel identifiers of the first communications network and the second communications network.

Optionally, the sending module is further configured to: send a correspondence between access type information and a tunnel identifier to the UPF; or send a data packet forwarding rule; or send a correspondence between access type information and a tunnel identifier and a data packet forwarding rule to the UPF. The data packet forwarding rule includes a correspondence between data flow description information and access type information.

Optionally, the sending module is further configured to send fifth multi-access indication information and the session identifier to the mobility management functional entity, where the fifth multi-access indication information is used to indicate that the session service corresponding to the session identifier is a multi-access PDU session.

Optionally, the sending module is further configured to: send seventh multi-access indication information, the session identifier, and the access type information to a PCF, where the seventh multi-access indication information is used to indicate that a PDU session corresponding to the session identifier is a multi-access PDU session; or send a fourth transmission message to the PCF. The fourth transmission message includes the session identifier, access type information of a first communications network, and access type information of a second communications network, and the fourth transmission message is used to indicate that the PCF stores a binding relationship between the session identifier and the access type information of the first communications network and the access type information of the second communications network.

The apparatus in this embodiment may be configured to perform the technical solutions of the foregoing method embodiments. Implementation principles and technical effects of the apparatus are similar to those of the foregoing method embodiments. Details are not described herein again.

For a detailed process of interaction between each apparatus and another communications network element, refer to descriptions of the foregoing method embodiments. For beneficial effects of each apparatus, refer to beneficial effects of the foregoing method embodiments. Details are not described herein again.

When at least some functions of the connection processing method in a multi-access scenario in this embodiment of the present disclosure are implemented by software, an embodiment of the present disclosure further provides a computer-readable storage medium. The computer-readable storage medium is configured to store a computer software instruction used by the foregoing mobility management functional entity. When the computer software instruction runs on a computer, the computer may perform the connection processing methods in various possible multi-access scenarios in the foregoing method embodiments. When the computer executable instruction is loaded and executed on the computer, the procedure or functions according to the embodiments of the present disclosure are all or partially generated. The computer instruction may be stored in a computer-readable storage medium, or may be transmitted from one computer-readable storage medium to another computer-readable storage medium. The transmission may be performed with another website, computer, server, or data center in a wireless (such as cellular communication, infrared, short-distance wireless, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk solid state disk (SSD)), or the like.

When at least some functions of the connection processing method in a multi-access scenario in this embodiment of the present disclosure are implemented by software, an embodiment of the present disclosure further provides a computer-readable storage medium. The computer-readable storage medium is configured to store a computer software instruction used by the foregoing session management functional entity. When the computer software instruction runs on a computer, the computer may perform the connection processing methods in various possible multi-access scenarios in the foregoing method embodiments. When the computer executable instruction is loaded and executed on the computer, the procedure or functions according to the embodiments of the present disclosure are all or partially generated. The computer instruction may be stored in a computer-readable storage medium, or may be transmitted from one computer-readable storage medium to another computer-readable storage medium. The transmission may be performed with another website, computer, server, or data center in a wireless (such as cellular communication, infrared, short-distance wireless, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, an SSD), or the like.

In addition, an embodiment of the present disclosure further provides a computer program product, namely, a software product, that includes an instruction. When the instruction runs on a computer, the computer performs the connection processing methods in various possible multi-access scenarios in the foregoing method embodiments. Implementation principles and technical effects of the computer program product are similar to those of the foregoing method embodiments. Details are not described herein again.

Finally, it should be noted that the foregoing embodiments are merely intended for describing the technical solutions of this application instead of limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A connection processing method in a multi-access scenario, wherein the method comprises:

receiving, by a session management functional entity, a second transmission message from a mobility management functional entity, wherein the second transmission message comprises second multi-access indication information and a session identifier, wherein the second multi-access indication information indicates that user equipment requests to establish a multi-access protocol data unit (PDU) session for a session corresponding to the session identifier, and wherein the multi-access PDU session supports access to a first communications network and a second communications network;

determining, by the session management functional entity, whether establishment of the multi-access PDU session is allowed based on session subscription data of the user equipment;

in response to determining that the establishment of the multi-access PDU session is allowed based on session subscription data of the user equipment, sending, by the session management functional entity, an N4 session establishment or update request message to a user plane functional entity, wherein the N4 session establishment or update request message comprises a fourth multi-access indication information, wherein the fourth multi-access indication information instructs to store access network side tunnel identifiers of the first communications network and the second communications network; and receiving, by the session management functional entity, a connection establishment reply message from the user plane functional entity.

2. The method according to claim 1, further comprising:
sending a session establishment or update message to a user plane functional entity, wherein the session establishment or update message instructs the user plane functional entity to establish, for the session, a tunnel identifier corresponding to an access network side of a second communications network.

3. The method according to claim 1, further comprising:
sending a seventh multi-access indication information, the session identifier, and an access type information to a policy control function entity, wherein the seventh multi-access indication information indicates that a PDU session corresponding to the session identifier is a multi-access PDU session.

4. The method according to claim 1, further comprising:
sending fifth multi-access indication information and the session identifier to the mobility management functional entity, wherein the fifth multi-access indication information indicates that the session corresponding to the session identifier is a multi-access PDU session.

5. The method according to claim 1, wherein the second transmission message further comprises a permanent identifier of the user equipment.

6. A session management apparatus, the apparatus comprising:
at least one processor; and
a memory storing computer-executable instructions, wherein the computer-executable instructions, when executed by the at least one processor, instruct the at least one processor to:
receive a second transmission message from a mobility management functional entity, wherein the second transmission message comprises second multi-access indication information and a session identifier, wherein the second multi-access indication information indicates that a user equipment requests to establish a multi-access protocol data unit (PDU)

session for a session corresponding to the session identifier, and wherein the multi-access PDU session supports access to a first communications network and a second communications network;

determine whether establishment of the multi-access PDU session is allowed based on session subscription data of the user equipment;

in response to determining that the establishment of the multi-access PDU session is allowed based on session subscription data of the user equipment, sending an N4 session establishment or update request message to a user plane functional entity, wherein the N4 session establishment or update request message comprises a fourth multi-access indication information, wherein the fourth multi-access indication information instructs to store access network side tunnel identifiers of the first communications network and the second communications network; and receiving a connection establishment reply message from the user plane functional entity.

7. The session management apparatus according to claim 6, wherein the computer-executable instructions instruct the at least one processor to:

send a session establishment or update message to a user plane functional entity, wherein the session establishment or update message instructs the user plane functional entity to establish, for the session, a tunnel identifier corresponding to an access network side of a second communications network.

8. The session management apparatus according to claim 6, wherein the computer-executable instructions instruct the at least one processor to:

send a seventh multi-access indication information, the session identifier, and access type information to a policy control function entity, wherein the seventh multi-access indication information indicates that a PDU session corresponding to the session identifier is a multi-access PDU session.

9. The session management apparatus according to claim 6, wherein the computer-executable instructions instruct the at least one processor to:

send a fifth multi-access indication information and the session identifier to the mobility management functional entity, wherein the fifth multi-access indication information indicates that the session corresponding to the session identifier is a multi-access PDU session.

10. The session management apparatus according to claim 6, wherein the second transmission message further comprises a permanent identifier of the user equipment.

11. A communication device, the device comprising:
at least one processor; and
a memory storing computer-executable instructions, wherein the computer-executable instructions, when executed by the at least one processor, instruct the at least one processor to:
initiate registration with a first communications network and a second communications network;
after the registration succeeds, determine whether the first communications network and the second communications network belong to a same public land mobile network (PLMN);
in response to determining that the first communications network and the second communications network belong to a same PLMN, send a non-access stratum message to a core-network network device, wherein the non-access stratum message comprises a multi-access protocol data unit (PDU) session parameter, wherein the multi-access PDU session parameter comprises second multi-access indication information and a session identifier, and wherein the second multi-access indication information is for indicating that the communication device requests to establish a multi-access PDU session for a session corresponding to the session identifier.

12. A connection processing system in a multi-access scenario, the system comprising a session management functional entity and a mobility management functional entity, wherein:

the mobility management functional entity is configured to send a second transmission message to the session management functional entity, wherein the second transmission message comprises second multi-access indication information and a session identifier, wherein the second multi-access indication information is used to indicate that a user equipment requests to establish a multi-access protocol data unit (PDU) session for a session corresponding to the session identifier, and wherein the multi-access PDU session supports access to a first communications network and a second communications network; and the session management functional entity is configured to:
receive the second transmission message;
determine whether establishment of the multi-access PDU session is allowed based on session subscription data of the user equipment;
in response to determining that the establishment of the multi-access PDU session is allowed based on session subscription data of the user equipment, send an N4 session establishment or update request message to a user plane functional entity, wherein the N4 session establishment or update request message comprises a fourth multi-access indication information, wherein the fourth multi-access indication information instructs to store access network side tunnel identifiers of the first communications network and the second communications network; and
receive a connection establishment reply message from the user plane functional entity.

13. The connection processing system according to claim 12, wherein the mobility management functional entity is configured to send the second multi-access indication information through the second transmission message in response to determining that establishment of a multi-access connection for the PDU session is allowed.

14. The connection processing system according to claim 12, wherein the session management functional entity is configured to:

send a session establishment or update message to a user plane functional entity, wherein the session establishment or update message instructs the user plane functional entity to establish, for the session, a tunnel identifier corresponding to an access network side of the second communications network.

15. The connection processing system according to claim 12, wherein:

the mobility management functional entity is configured to generate a third multi-access indication information and send the third multi-access indication information to the session management functional entity through the second transmission message in response to determining that establishment of a multi-access connection for the PDU session is allowed, wherein the third multi-access indication information is a multi-access status indication, wherein the multi-access status indication is used to indicate a state in which the user equipment accesses both the first communications network and the second communications network.

16. The connection processing system according to claim 12, wherein:
the session management functional entity is configured to send a fifth multi-access indication information and the session identifier to the mobility management functional entity, wherein the fifth multi-access indication information is used to indicate that the session corresponding to the session identifier is a multi-access PDU session; and
the mobility management functional entity is configured to mark the session corresponding to the session identifier as a multi-access PDU session based on the fifth multi-access indication information.

17. The method according to claim 1, further comprising:
sending, by the mobility management functional entity, the second multi-access indication information through the second transmission message in response to determining that establishment of a multi-access connection for the PDU session is allowed.

18. The method according to claim 1, further comprising:
generating, by the mobility management functional entity, a third multi-access indication information and sending the third multi-access indication information to the session management functional entity through the second transmission message in response to determining that establishment of a multi-access connection for the PDU session is allowed, wherein the third multi-access indication information is a multi-access status indication, wherein the multi-access status indication indicates a state in which the user equipment accesses both the first communications network and the second communications network.

19. The method according to claim 4, further comprising:
marking, by the mobility management functional entity, the session corresponding to the session identifier as a multi-access PDU session based on the fifth multi-access indication information.

20. The device according to claim 11,
wherein the first communications network is 3GPP network, and the second communications network is non-3GPP network; or,
wherein the first communications network is non-3GPP network, and the second communications network is 3GPP network.

21. The device according to claim 11,
wherein the communication device accesses the core-network network device through the first communications network and the second communications network.

* * * * *